(12) United States Patent
Aoki et al.

(10) Patent No.: US 12,081,916 B2
(45) Date of Patent: Sep. 3, 2024

(54) VIDEO DISPLAY DEVICE AND PROJECTOR

(71) Applicant: Maxell, Ltd., Kyoto (JP)

(72) Inventors: Hiroshi Aoki, Kyoto (JP); Mitsuo Nakajima, Kyoto (JP); Satomi Furuhata, Kyoto (JP); Eriko Yabe, Kyoto (JP); Atsushi Kato, Kyoto (JP); Naoya Oka, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 17/767,623

(22) PCT Filed: Oct. 10, 2019

(86) PCT No.: PCT/JP2019/040086
§ 371 (c)(1),
(2) Date: Apr. 8, 2022

(87) PCT Pub. No.: WO2021/070342
PCT Pub. Date: Apr. 15, 2021

(65) Prior Publication Data
US 2023/0051479 A1   Feb. 16, 2023

(51) Int. Cl.
*H04N 9/31* (2006.01)
*G09G 3/00* (2006.01)

(52) U.S. Cl.
CPC .......... *H04N 9/3182* (2013.01); *G09G 3/002* (2013.01); *G09G 2320/0606* (2013.01); *G09G 2320/0626* (2013.01); *G09G 2354/00* (2013.01)

(58) Field of Classification Search
CPC ...... H04N 9/3182; H04N 9/3194; H04N 5/57; H04N 5/66; H04N 9/64; H04N 5/20;
(Continued)

(56) References Cited

U.S. PATENT DOCUMENTS 5,351,141 A    9/1994  Tsuji et al.
6,160,593 A *  12/2000 Nakakuki .............. H04N 23/84
                                                  348/649
(Continued)

FOREIGN PATENT DOCUMENTS

JP    05-191824 A    7/1993
JP    2000-513907 A  10/2000
(Continued)

OTHER PUBLICATIONS

International Search Report of PCT/JP2019/040086 dated Dec. 24, 2019.

*Primary Examiner* — John W Miller
*Assistant Examiner* — Humam M Satti
(74) *Attorney, Agent, or Firm* — Mattingly & Malur, PC

(57) ABSTRACT

A video display device includes performs a first Retinex process on an inputted video and a second Retinex process, which is different from the first Retinex process, on the inputted video. A video composing unit is configured to compose a video processed by the first Retinex processing unit and a video processed by the second Retinex processing unit in accordance with a feature of the inputted video, which is then displayed. In a process of composing the video processed by the first and second Retinex processing units, the video composing unit is configured to perform a process of converting a luminance level for each pixel so that more output luminance levels are assigned to a luminance band having a large frequency distribution to improve visibility of the video. A gain of the luminance level converting process is varied in accordance with an average pixel value level of the inputted video.

30 Claims, 27 Drawing Sheets

(58) Field of Classification Search
CPC .. H04N 9/69; G09G 3/002; G09G 2320/0606; G09G 2320/0626; G09G 2354/00; G09G 5/00; G09G 5/36; G09G 5/377; G09G 5/10; G09G 2340/10; G06T 5/00; G06T 2207/10016; G06T 5/90

See application file for complete search history.

(56) References Cited

U.S. PATENT DOCUMENTS

| | | | |
|---|---|---|---|
| 6,373,533 | B1 | 4/2002 | Kawabata et al. |
| 8,547,404 | B2* | 10/2013 | Fujine ................. G09G 3/3406 349/61 |
| 2003/0112378 | A1* | 6/2003 | Okunuki .............. H04N 5/7416 348/E5.127 |
| 2004/0246537 | A1* | 12/2004 | Ohyama ............... H04N 5/202 358/509 |
| 2005/0140830 | A1* | 6/2005 | Kim ........................ H04N 9/69 348/673 |
| 2006/0227085 | A1* | 10/2006 | Boldt, Jr. ................ G01J 3/506 348/E17.005 |
| 2009/0267876 | A1* | 10/2009 | Kerofsky ............. G09G 3/2007 345/87 |
| 2012/0242904 | A1* | 9/2012 | Shirai .................. G09G 3/3426 348/673 |
| 2016/0307489 | A1 | 10/2016 | Nakajima et al. |
| 2019/0050971 | A1 | 2/2019 | Fukuda et al. |

FOREIGN PATENT DOCUMENTS

| | | |
|---|---|---|
| JP | 2005-004506 A | 1/2005 |
| JP | 2005-198338 A | 7/2005 |
| JP | 2006-311167 A | 11/2006 |
| JP | 2010-130399 A | 6/2010 |
| JP | 2010-213008 A | 9/2010 |
| WO | 2015/097780 A1 | 7/2015 |
| WO | 2017/046905 A1 | 3/2017 |

* cited by examiner

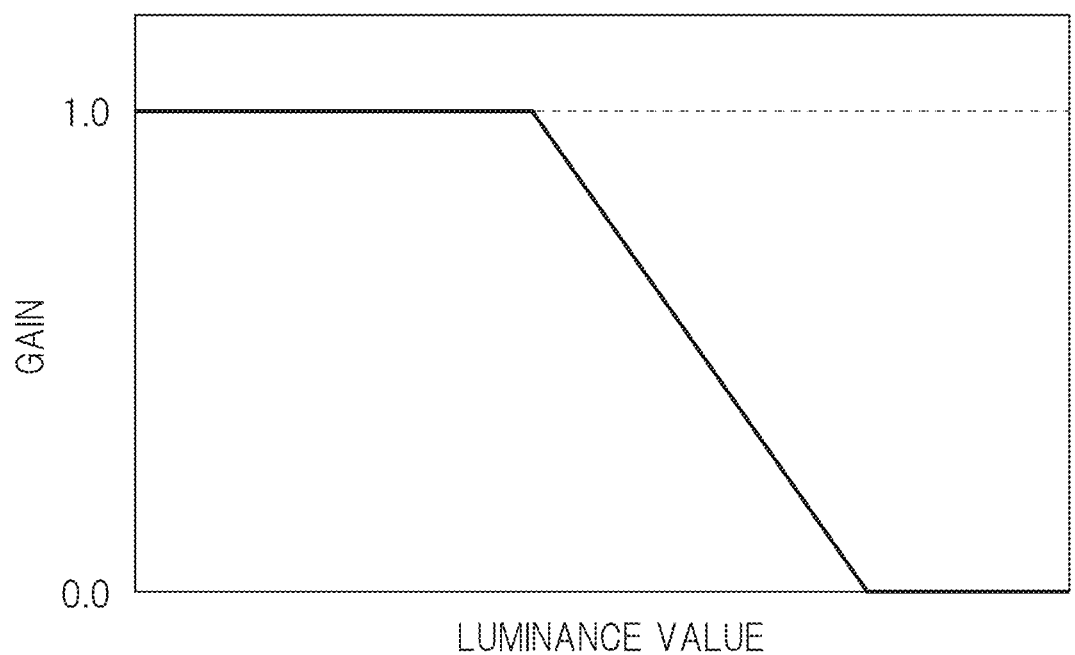

FIG. 22

| Video adaptive visibility improvement control OFF | | APL (%) | | | | | | |
|---|---|---|---|---|---|---|---|---|
| | | 0 | 10 | 30 | 60 | 90 | 100 | |
| Luminance visibility improvement gain β (Normalize by setting the maximum gain to 100 and setting the minimum gain to 0) | Lv.4 (OFF) | 100 | 100 | 100 | 100 | 100 | 100 | |
| | Lv.3 (OFF) | 57 | 57 | 57 | 57 | 57 | 57 | |
| | Lv.2 (OFF) | 13 | 13 | 13 | 13 | 13 | 13 | |
| | Lv.1 (OFF) | 0 | 0 | 0 | 0 | 0 | 0 | |

FIG. 23

| Video adaptive visibility improvement control ON | | APL (%) | | | | | | |
|---|---|---|---|---|---|---|---|---|
| | | 0 | 10 | 30 | 60 | 90 | 100 |
| Luminance visibility improvement gain β (Normalize by setting the maximum gain to 100 and setting the minimum gain to 0) | Lv.4 (ON) | 87 | 92 | 95 | 95 | 95 | 95 |
| | Lv.3 (ON) | 48 | 52 | 56 | 56 | 56 | 56 |
| | Lv.2 (ON) | 32 | 37 | 40 | 40 | 40 | 40 |
| | Lv.1 (ON) | 24 | 29 | 32 | 32 | 32 | 32 |

FIG. 26

| Video adaptive visibility improvement control OFF | APL (%) | | | | | | | |
|---|---|---|---|---|---|---|---|---|
| | 0 | 10 | 30 | 60 | 90 | 100 | | |
| Lv.4 (OFF) | 100 | 100 | 100 | 100 | 100 | 100 | | |
| Lv.3 (OFF) | 69 | 69 | 69 | 69 | 69 | 69 | | |
| Lv.2 (OFF) | 38 | 38 | 38 | 38 | 38 | 38 | | |
| Lv.1 (OFF) | 0 | 0 | 0 | 0 | 0 | 0 | | |

Color correction ratio gain (Normalize by setting the maximum gain to 100 and setting the minimum gain to 0)

FIG. 27

| Video adaptive visibility improvement control ON | | APL (%) | | | | | | |
|---|---|---|---|---|---|---|---|---|
| | | 0 | 10 | 30 | 60 | 90 | 100 |
| Color correction ratio gain (Normalize by setting the maximum gain to 100 and setting the minimum gain to 0) | Lv.4 (ON) | 0 | 31 | 63 | 100 | 100 | 100 |
| | Lv.3 (ON) | 0 | 31 | 63 | 100 | 100 | 100 |
| | Lv.2 (ON) | 0 | 31 | 63 | 100 | 100 | 100 |
| | Lv.1 (ON) | 0 | 31 | 63 | 100 | 100 | 100 |

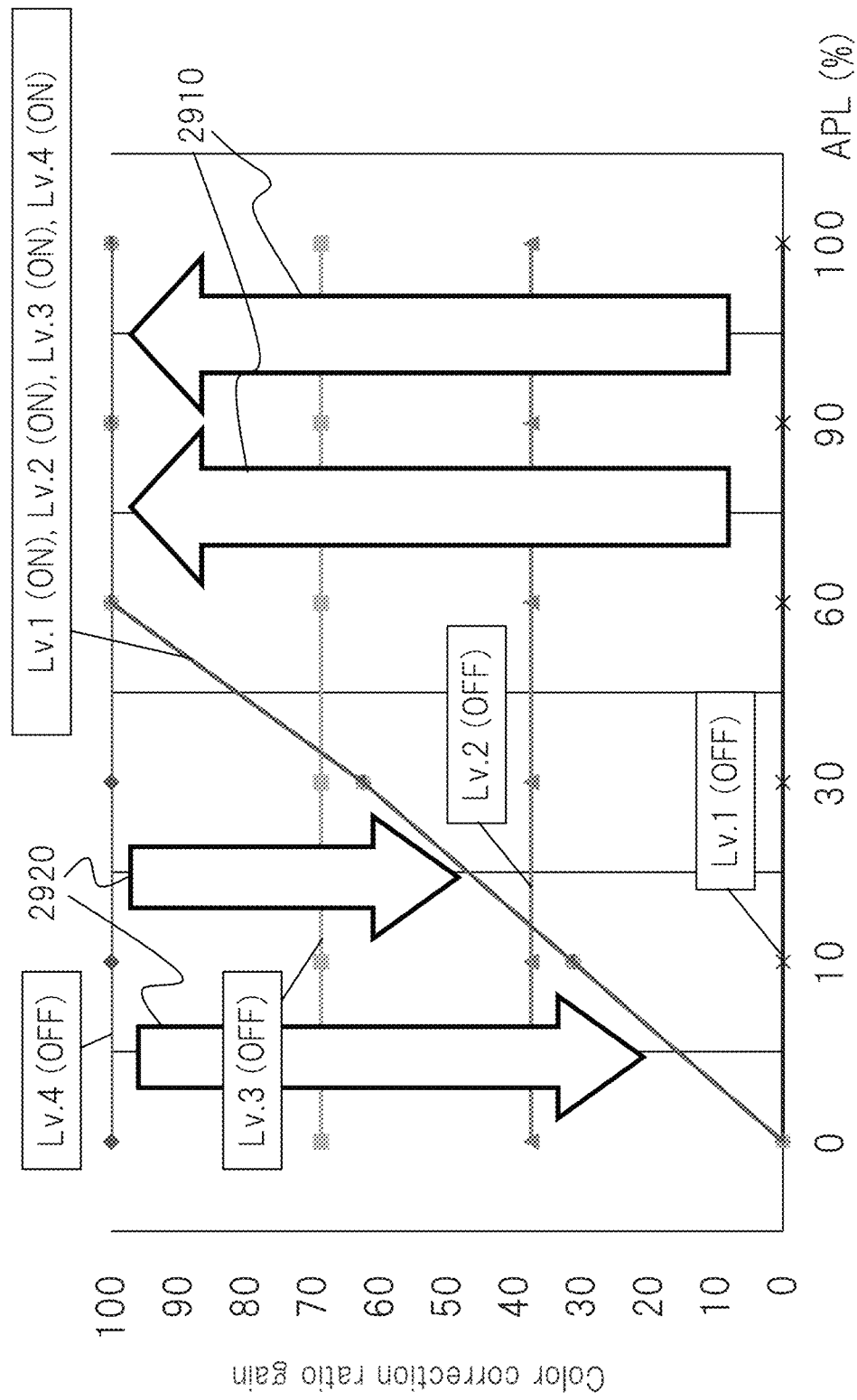

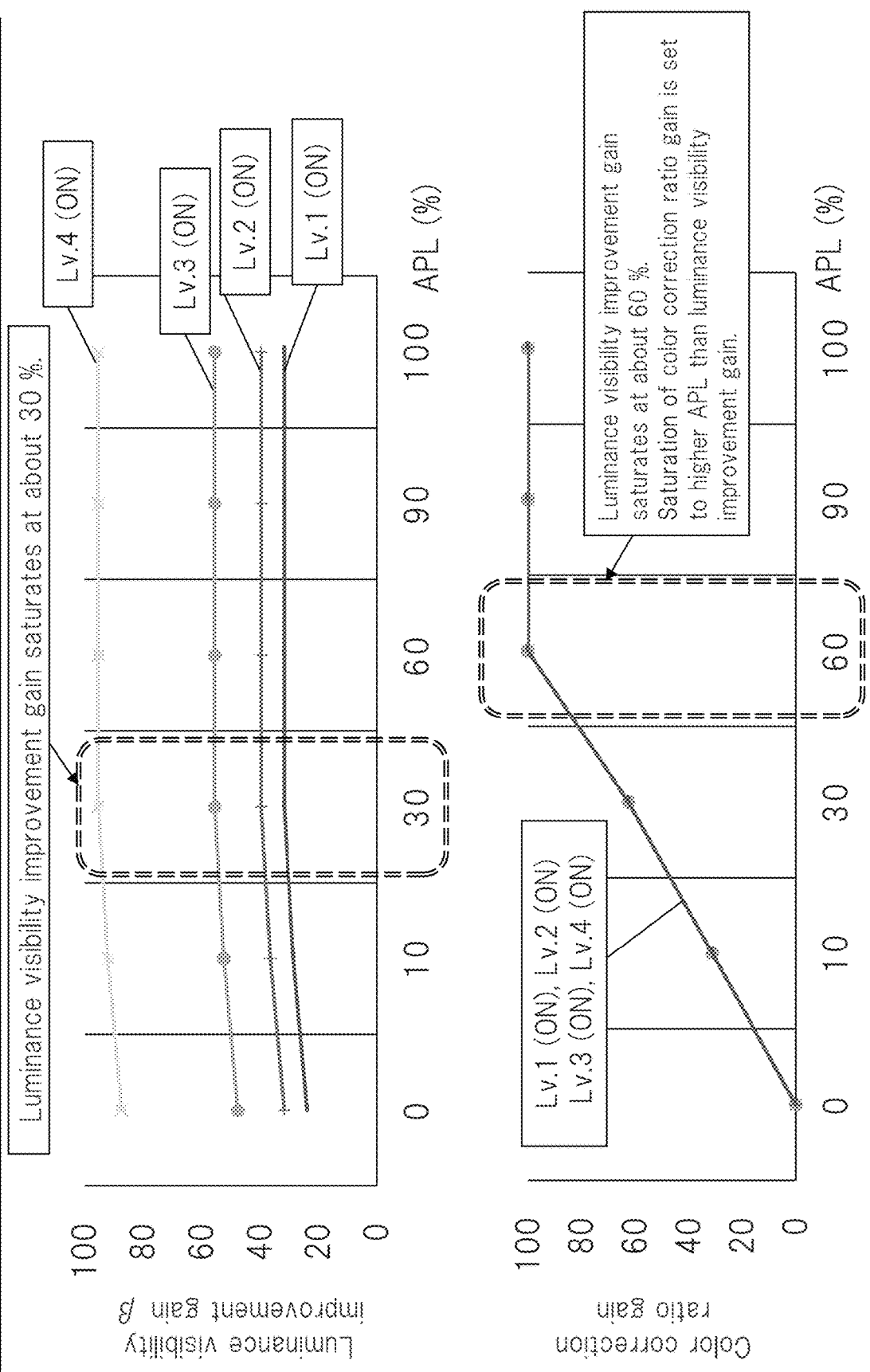

VIDEO DISPLAY DEVICE AND PROJECTOR

TECHNICAL FIELD

The present invention relates to a video processing technique.

BACKGROUND ART

As a background technique of the present technical field, Patent Document 1 is cited. In the publication, in a Multi Scale Retinex process, a composite blur image is created by selecting any one of a plurality of blur images which are generated from a plurality of peripheral functions different scales and which are different in a degree of the blur for each pixel in accordance with a pixel value level of an original image to be a processing target. It is described that the composite blur image is subjected to low pass filter, so that the Retinex process is performed while occurrence of unnatural discontinuation in a boundary is prevented (see Abstract).

RELATED ART DOCUMENTS

Patent Documents

Patent Document 1: Japanese Patent Application Laid-Open Publication No. 2005-004506

SUMMARY OF THE INVENTION

Problems to be Solved by the Invention

As a parameter indicating a property of an object captured in video signals, there are various parameters such as a luminance, a color, and a frequency component, and these values are different from each other when video scenes are different from each other. In order to display the video with a good visibility, it is required to correct the video by changing a property such as a contrast correction of the video in accordance with a feature of the video.

However, in such a technique of adjusting a plurality of scales and achieving high performance of a dynamic range compression in an MSR as disclosed in Patent Document 1, contribution of the video to the plurality of scales is considered while the feature of the object is not considered. Therefore, the correction is uniformly performed regardless of the feature of the object in the video.

In addition, in such a technique of adjusting a plurality of scales and achieving high performance of a dynamic range compression in an MSR as disclosed in Patent Document 1, the contribution of the video to the plurality of scales is considered while a contribution of the video to difference in a reflection property is not considered.

Means for Solving the Problem

In order to solve the problem described above, an aspect of the present invention may be configured so as to be provided with, for example, a video input unit; a first Retinex processing unit configured to perform a first Retinex process on a video inputted from the video input unit; a second Retinex processing unit configured to perform a second Retinex process, which is different from the first Retinex process in a method, on the video inputted from the video input unit; a video composing unit configured to compose a video processed by the first Retinex processing unit and a video processed by the second Retinex processing unit in accordance with a feature of the video inputted from the video input unit; and a display unit configured to display a video based on the video outputted from the video composing unit, in which in a process of composing the video processed by the first Retinex processing unit and the video processed by the second Retinex processing unit, the video composing unit is configured to perform a luminance level converting process of converting a luminance level for each pixel so that more output luminance levels are assigned to a luminance band having a large frequency distribution to improve visibility of a video, and a gain of the luminance level converting process is varied in accordance with an average pixel value level of the video inputted from the video input unit.

Effects of the Invention

According to the present invention, a video having more appropriately improved visibility can be obtained.

BRIEF DESCRIPTIONS OF THE DRAWINGS

FIG. 12B is a diagram for describing a diffusion correction gain based on a luminance value of a video;

FIG. 22 is an example of a control of a luminance visibility improvement gain according to the fifth embodiment of the present invention;

FIG. 23 is an example of a control of a luminance visibility improvement gain according to the fifth embodiment of the present invention;

FIG. 26 is an example of a control of a color correction ratio gain according to a sixth embodiment of the present invention;

FIG. 27 is an example of a control of a color correction ratio gain according to the sixth embodiment of the present invention;

FIG. 29 is an explanatory drawing of an example of a control of a color correction ratio gain according to the sixth embodiment of the present invention; and FIG. 30 is an explanatory drawing of an example of a control of a luminance visibility improvement gain and control of color correction ratio gain according to the sixth embodiment of the present invention.

DETAILED DESCRIPTION OF EMBODIMENTS

Hereinafter, embodiments of the present invention will be described based on the accompanying drawings. However, the present invention is not always limited to these embodiments. Note that the same components are denoted by the same reference symbols throughout each drawing for describing the embodiments, and the repetitive description thereof will be omitted.

First Embodiment

In the present embodiment, a video display device which corrects a video by video decomposition for each light reflection property will be described by using a configuration of a projector (projection type video display device). Note that the following will be explanation in a case of a front projector. However, a rear projection television may be applied as another example. In addition, without performing a magnification projection of a panel, a display device using a direct-vision flat display such as a liquid crystal display, a plasma display, or an organic EL display may be applied. This viewpoint is also the same in any of the following embodiments.

Figure 1:
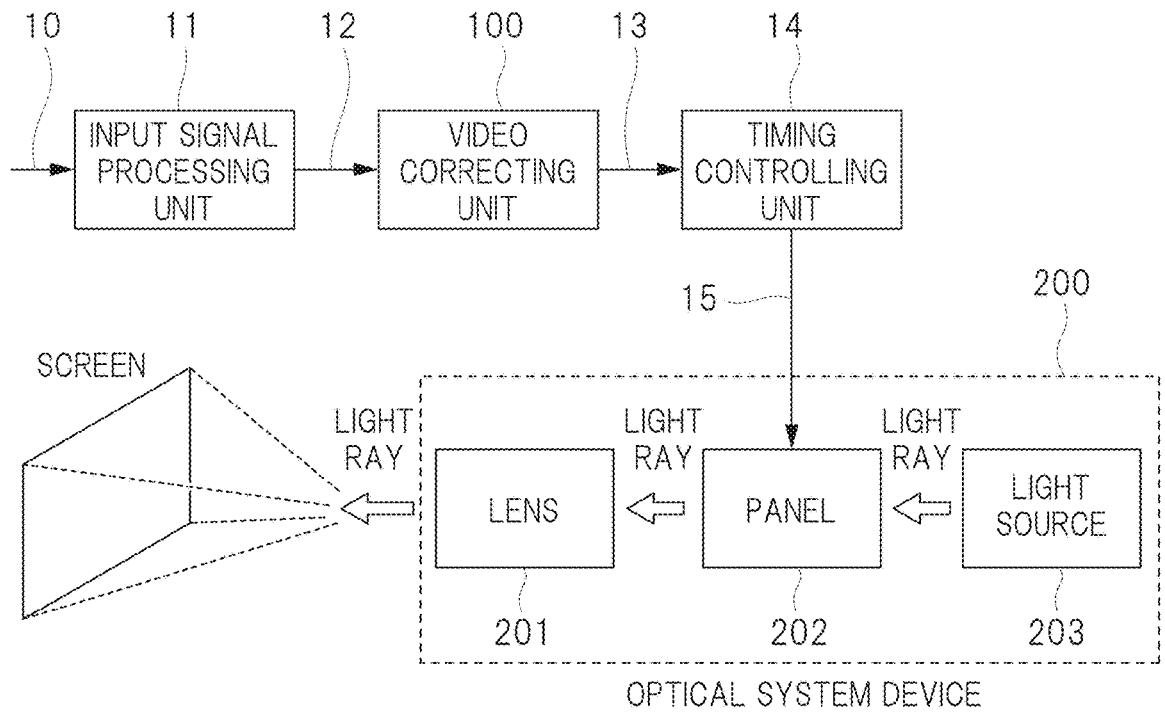
FIG. 1 is a diagram of a configuration example of a video display device according to a first embodiment of the present invention.

FIG. 1 is an example of a configuration diagram of the video display device of the present embodiment.

The present video display device has a configuration including: an input signal processing unit 11 which receives a video input signal 10 as an input and which converts the video input signal into an internal video signal 12 by, for example, a decoder, an IP conversion, a scalar, and others for a compressed video signal; a video correcting unit 100 which receives the internal video signal 12 as an input; a timing controlling unit 14 which receives a correction video signal 13 as an input and which generates a display control signal 15 based on horizontal/vertical synchronization signals of a display screen of the correction video signal; and an optical-system device 200 which displays a video.

The optical-system device 200 has a configuration including: an optical source 203 which emits a light ray for projecting the video to the screen; a panel 202 which receives the display control signal 15 as an input, which adjusts gradation of the light ray from the optical source 203 for each pixel, and which creates a projection video; and a lens 201 which is used for the magnification projection of the projection video onto the screen.

When the video display device is a direct-vision flat display such as a liquid crystal display, a plasma display, or an organic EL display, note that the lens 201 of the optical-system device 200 is not required. A user directly views the panel 202.

Figure 2:
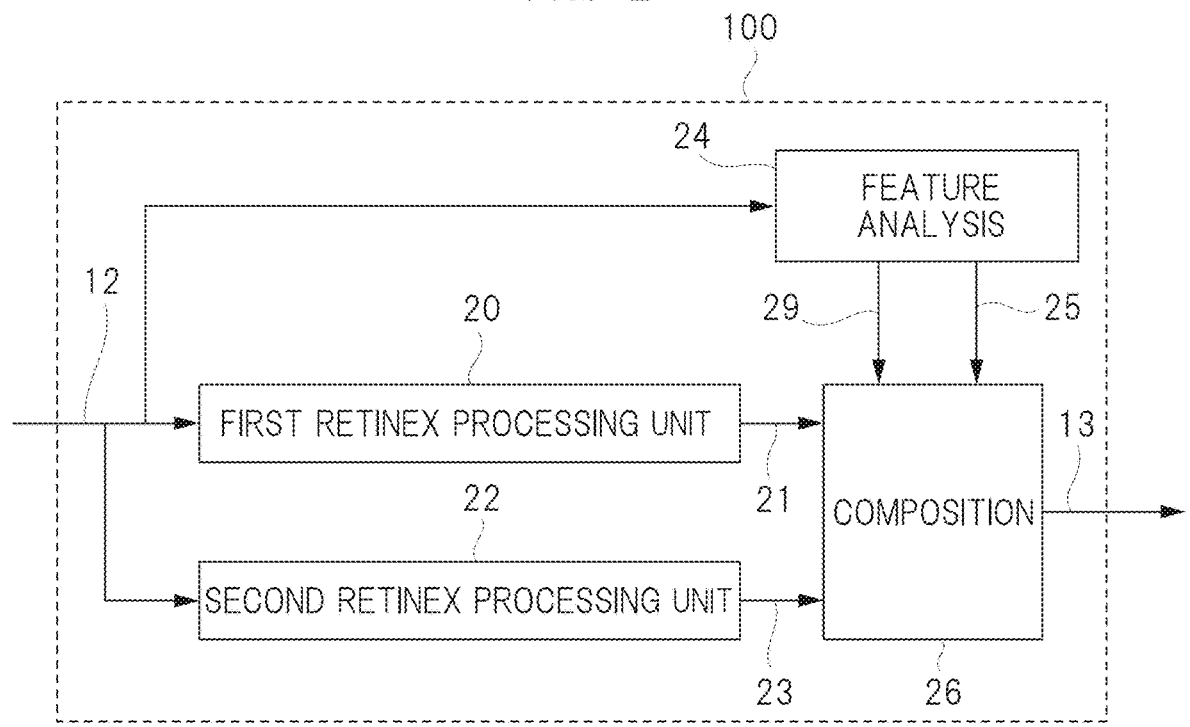
FIG. 2 is a diagram of a configuration example of a video correcting unit.

An example of a configuration of the video correcting unit 100 is illustrated in FIG. 2. A first Retinex processing unit 20 and a second Retinex processing unit 22 perform a video processing on the internal video signal 12 based on a Retinex theory, and output a first correction video signal 21 and a second correction video signal 23.

Here, the Retinex theory is a theory on a visual property of human eyes such as color constancy and brightness constancy. By the theory, an illumination light component can be separated from the video, and a reflected light component can be extracted.

Therefore, in a video correcting process based on the Retinex theory, a high visibility video can be obtained even for a video in a dark room or under a bright backlight by removing an influence of the illumination light component being a cause by which an object such as a person in the video is difficult to be viewed and by extracting the reflected light component. Accordingly, a dynamic range which a human can naturally see and feel can be appropriately compressed even in a digital gradation.

The Retinex theory has a lot of models based on estimation methods of the illumination light component or the reflected light component. For example, in the following Reference Document 1, the models of McCann 99, PSEUDO, Poisson, and QP are compared.

In addition, a Retinex for extracting the reflected light component under estimation of a local illumination light component so as to follow a Gaussian distribution is called as a Center/Surround (hereinafter, referred to as C/S) Retinex. The models represented by the Retinex include a Single Scale Retinex model (hereinafter, SSR), a Multiscale Retinex model (hereinafter, referred to as MSR), and others.

The SSR is a model in which a luminance component of the reflected light with respect to one scale is extracted from the video (for example, see the following Reference Document 2), and the MSR is a model in which the SSR is expended and a luminance component of the reflected light with respect to a plurality of scales is extracted from the video (for example, see the Reference Document 3).

[Reference Document 1] "Comparison of Retinex Models for Hardware Implementation (Comparison Evaluation of Retinex theory in achieving Hardware of Adaptive Gradation Correction)", Yoshihiro NOZATO and others, Shin-gaku Technical Report, SIS2005-16, (2005).

[Reference document 2] D. J. Jobson and G. A. Woodell, Properties of a Center/Surround Retinex: Part 2. Surround Design, NASA Technical Memorandum, 110188, 1995.

[Reference document 3] Zia-ur Rahman, Daniel J. Jobson, and Glenn A. Woodell, "Multiscale Retinex for Color Image Enhancement", ICIP '96

In the present embodiment, as an example, the first Retinex processing unit 20 is assumed to use the McCann 99 model excellent in illumination light estimation performance, and the second Retinex processing unit 22 is assumed to use the MSR model excellent in contrast correction performance. A feature analyzing unit 24 analyzes a feature of the internal video signal 12, and outputs a first video composing control signal 29 and a second video composing control signal 25 to a video composing unit 26. The video composing unit 26 composes the correction video signal 21 and the correction video signal 23 based on the first video composing control signal 29 and the second video composing control signal 25, and outputs the correction video signal 13.

Figure 3:
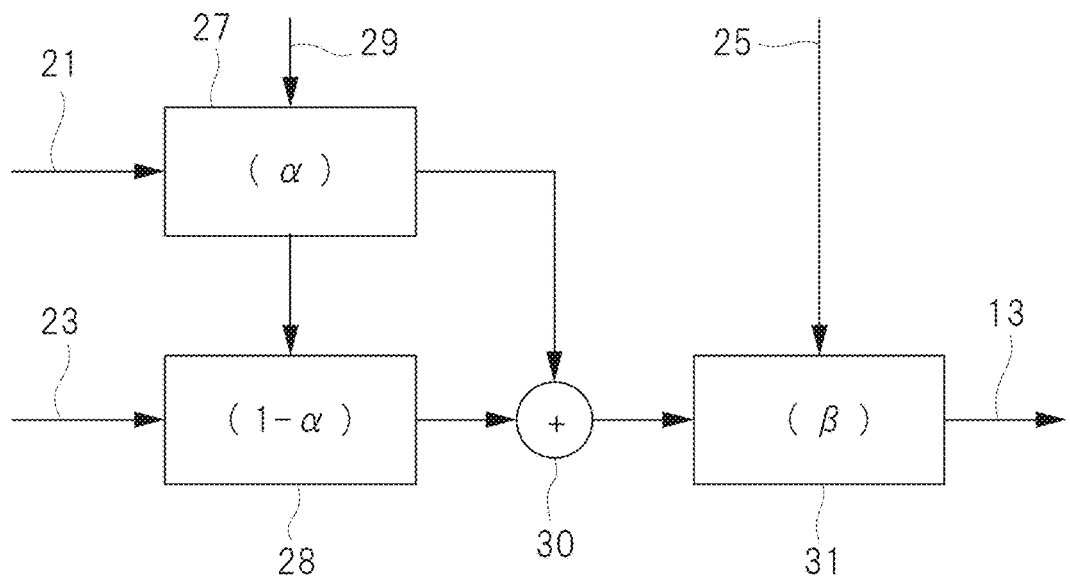
FIG. 3 is a diagram of a configuration example of a video composition unit.

FIG. 3 illustrates an example of a configuration of the video composing unit 26. The correction video signal 21 is magnified by "$\alpha$" in a gain control unit 27, the correction video signal 23 is magnified by "$(1-\alpha)$" in a gain control unit 28, and the both signals are subjected to an addition process in an adder 30, and then, are magnified by "$\beta$" in a gain control unit 31, so that the correction video signal 13 is obtained.

Next, an example of an operation of the configuration illustrated in FIGS. 1 to 3 will be described by using FIGS. 4A to C and FIGS. 5A to F.

First, a control by the first video composing control signal 29 in the present embodiment will be described.

Figure 4A:
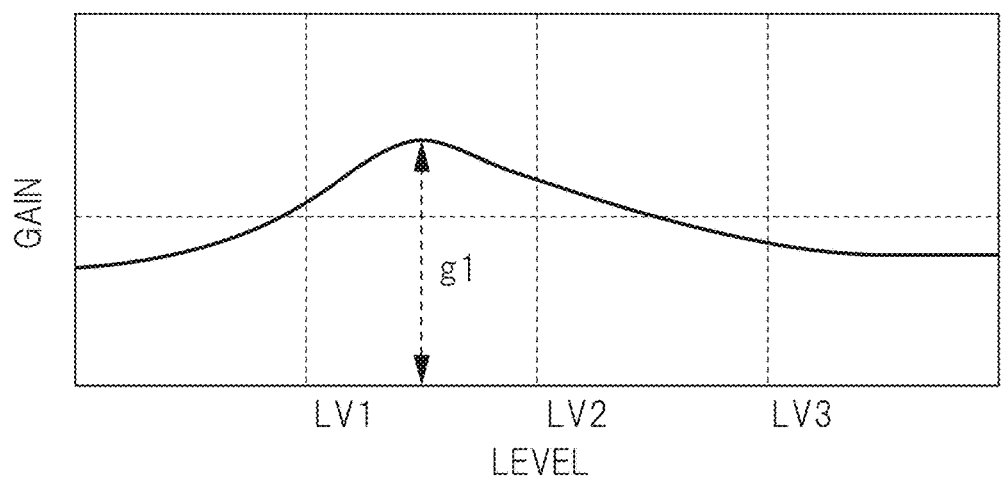
FIG. 4A is an example of a property of a first Retinex processing unit.
Figure 4B:
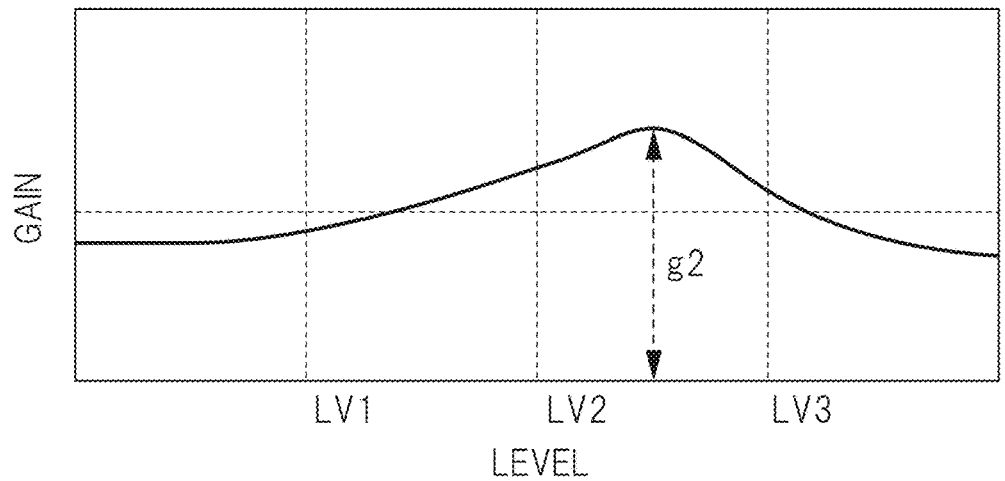
FIG. 4B is an example of a property of a second Retinex processing unit.

In FIGS. 4A and 4B, the horizontal axis represents a luminance level, the vertical axis represents a gain, and each of them shows an example of the gain property for the luminance levels of the first Retinex processing unit 20 and the second Retinex processing unit 22. In the present embodiment, the drawings illustrate an example of a case of usage of the McCann 99 model for the first Retinex processing unit 20 and usage of the MSR model for the second Retinex processing unit 22. In the example of FIG. 4A, the first Retinex processing unit 20 based on the McCann 99 model has a gain peak "g1" between luminance levels LV1 and LV2. In the example of FIG. 4B, the second Retinex processing unit 22 using the MSR model has a gain peak "g2" between LV2 and LV3.

Figure 4C:
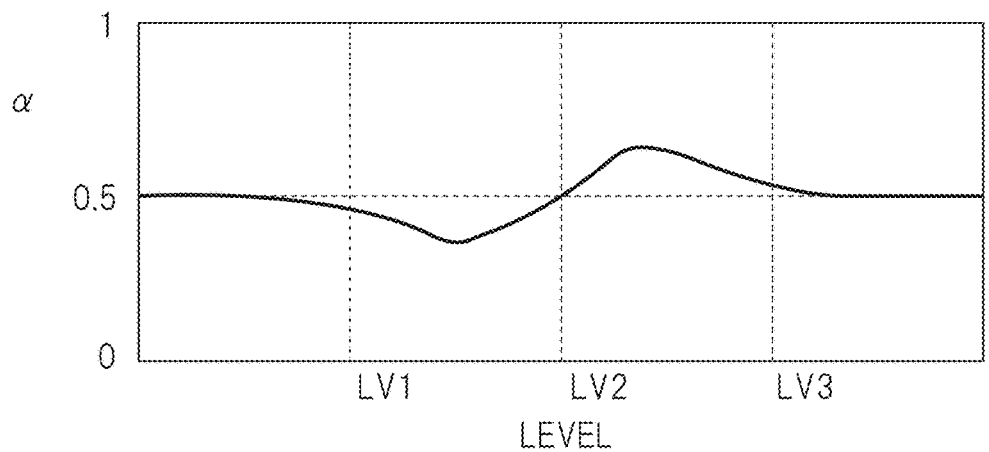
FIG. 4C is an example of a property of a video composition controlling signal.

FIG. 4C is a diagram illustrating an example of a composition control value "$\alpha$" based on the first video composing control signal 29 outputted from the feature analyzing unit 24 illustrated in FIG. 2 in a case that the properties of the first Retinex processing unit 20 and the second Retinex processing unit 22 are as illustrated in the above-described FIGS. 4A and 4B. As illustrated in FIG. 4C, a configuration control value is controlled so that the composition control value $\alpha$ is decreased at a luminance level at which the gain of the first Retinex processing unit 20 is higher than the gain of the second Retinex processing unit 22, and, on the contrary, the composition control value $\alpha$ is increased at a luminance level at which the gain of the first Retinex processing unit 20 is lower than the gain of the second Retinex processing unit 22. In this manner, input/output properties of the composition output video of the first Retinex processing unit 20 and the second Retinex processing unit 22 which is outputted from the adder 30 have a linear property.

By the process described above, it is possible to obtain a composition video having both advantages of the Retinex processing based on the McCann 99 model excellent in the illumination light estimation performance and the Retinex processing based on the MSR model excellent in contrast correction performance.

Next, a control by using the second video composing control signal 25 in the present embodiment will be described.

Figure 5A:
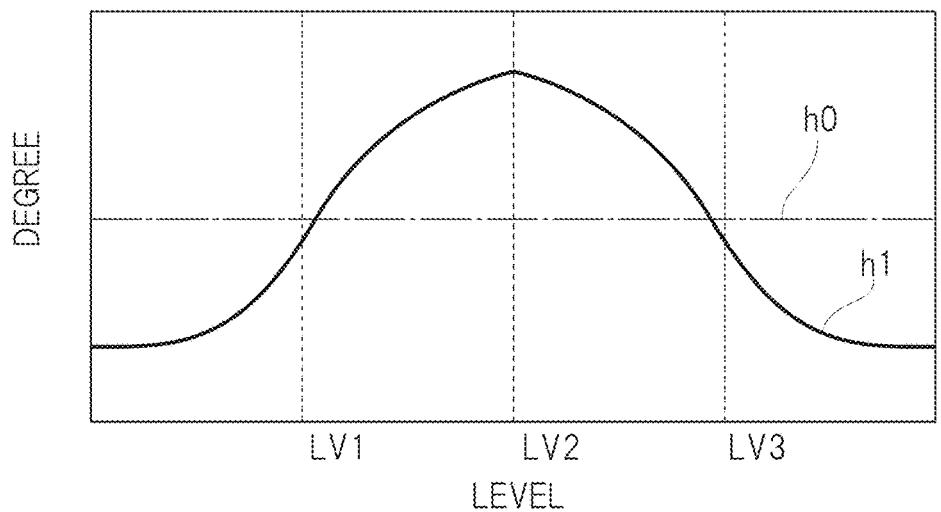
FIG. 5A is an example of luminance histogram of a video.
Figure 5B:
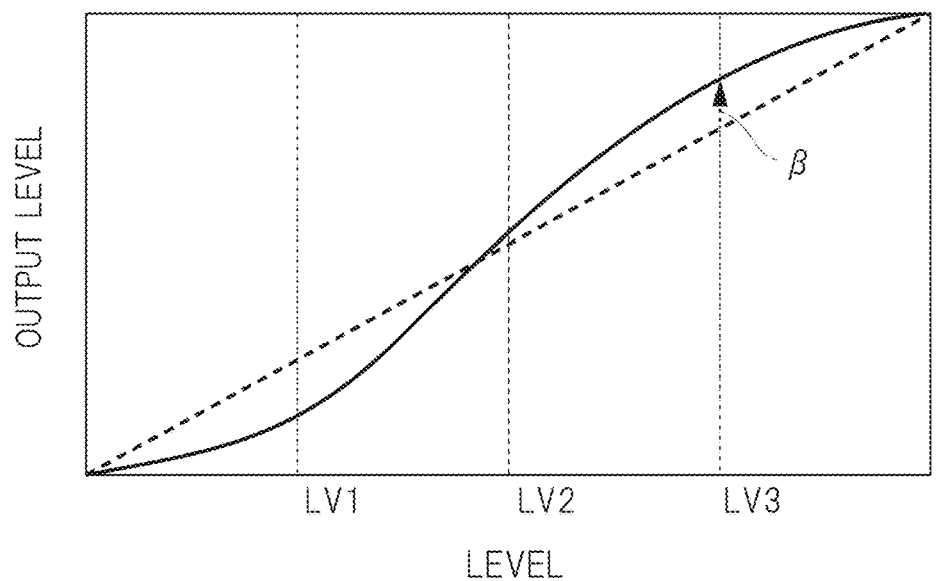
FIG. 5B is an example of an input/output property of a video.

FIGS. 5A and 5B illustrate an example of a control of the second video composing control signal 25 outputted from the feature analyzing unit 24.

First, in FIG. 5A, the horizontal axis represents a luminance level of a video, the vertical axis represents the number of pixels in one screen, and distribution of each luminance level is graphed as a histogram graph. In the example of FIG. 5A, a histogram h1 shows that the distribution in a range from the luminance level LV1 to the luminance level LV3 is larger than the distribution of the luminance level from the luminance level LV1 or lower and from the luminance level LV3 or higher. When the distribution in the range from the luminance level LV1 to the luminance level LV3 is flat, note that the distribution becomes a histogram h0 illustrated by a chain line.

In FIG. 5B, the horizontal axis represents a luminance level of an input video, the vertical axis represents a luminance level of an output video, and an example of the second video composing control signal 25 outputted from the feature analyzing unit 24 when the above-described luminance distribution of FIG. 5A is as the histogram h1. This drawing illustrates an input/output level property controlled by a gain control value $\beta$. When the luminance distribution of FIG. 5A is as the histogram h0, the input/output level property becomes the property illustrated by a dotted line of FIG. 5B. When the luminance distribution of FIG. the histogram h1, the input/output level property becomes the property illustrated by a solid line of FIG. 5B. Here, an item $\beta$ takes the linear property illustrated by a dotted line as a reference value ($\beta=1$). The property as illustrated by the solid line of FIG. 5B is obtained by varying the gain control value $\beta$ in accordance with an input level. In the example of FIG. 5B, the gain control value $\beta$ is 1 at LV2, but becomes a value smaller than 1 at LV1, and becomes a value larger than 1 at LV3. As described above, in the case of the histogram h1 of FIG. 5A, the input/output property curve in the range from LV1 to LV3 having the large luminance distribution is controlled by the gain control value $\beta$ so as to be steep as compared with a slope in other range. By obtaining the correction video signal 13 in such a property, more output luminance levels are assigned to an area having a large distribution in the video, and therefore, a video having a good visibility can be obtained.

FIGS. 5C to 5F are diagrams for describing an example of the control performed when the luminance distribution is different from FIG. 5A.

Figure 5C:
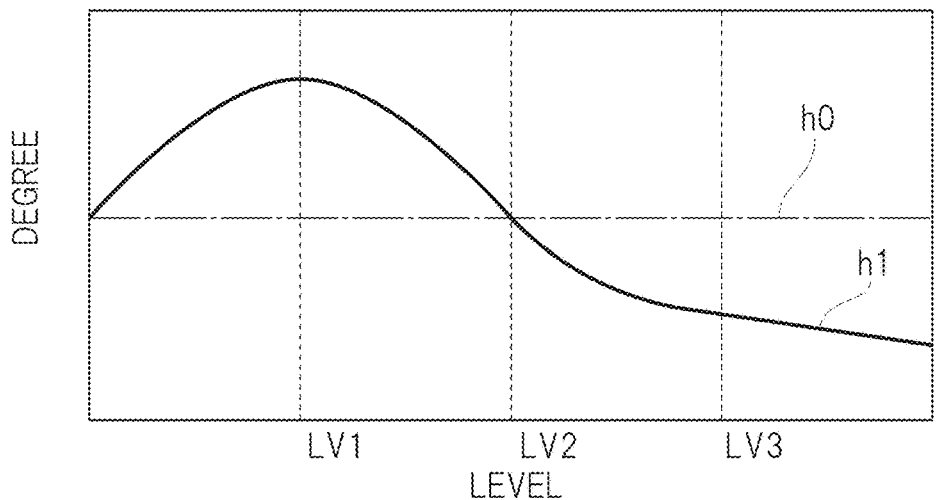
FIG. 5C is an example of luminance histogram of a video.
Figure 5D:
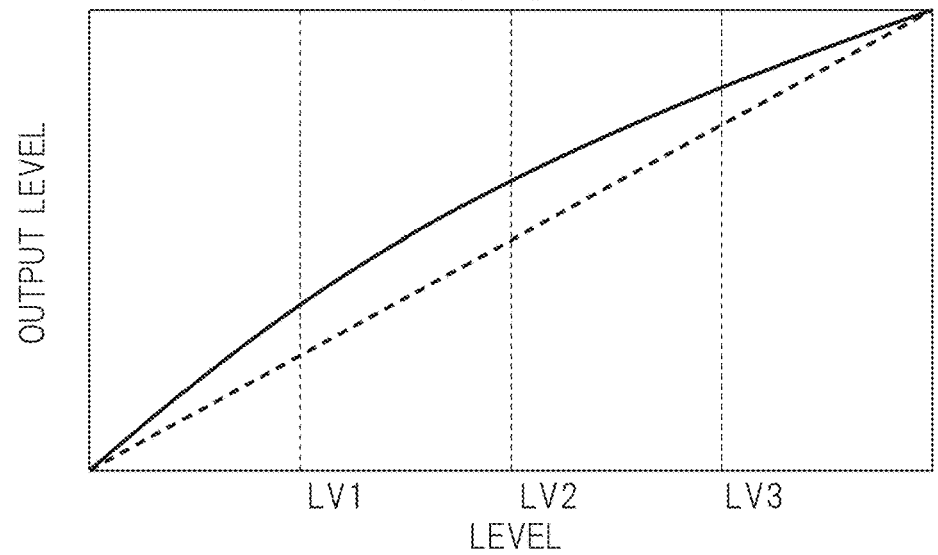
FIG. 5D is an example of an input/output property of a video.

First, FIG. 5C illustrates an example of a histogram obtained when the luminance distribution at the luminance level LV2 or lower is larger than that at the luminance level LV2 or higher. An example of the gain control value β in this case is illustrated in FIG. 5D. As illustrated in FIG. 5D, the slope of the property curve at the LV2 or lower having the large luminance distribution is controlled so as to be steep as compared to that at the luminance level LV2 or higher, so that more output luminance levels are assigned to a luminance band having the large video distribution. In this manner, a video having a good visibility can be obtained.

Figure 5E:
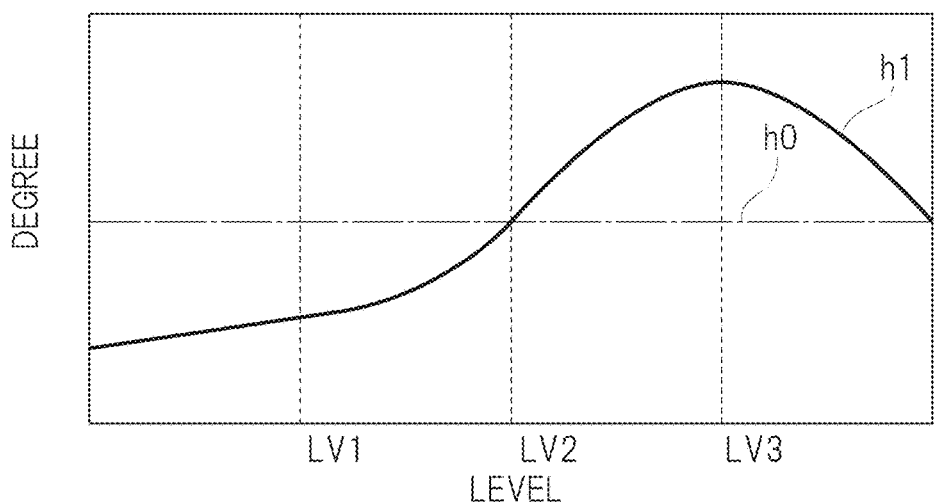
FIG. 5E is an example of luminance histogram of a video.
Figure 5F:
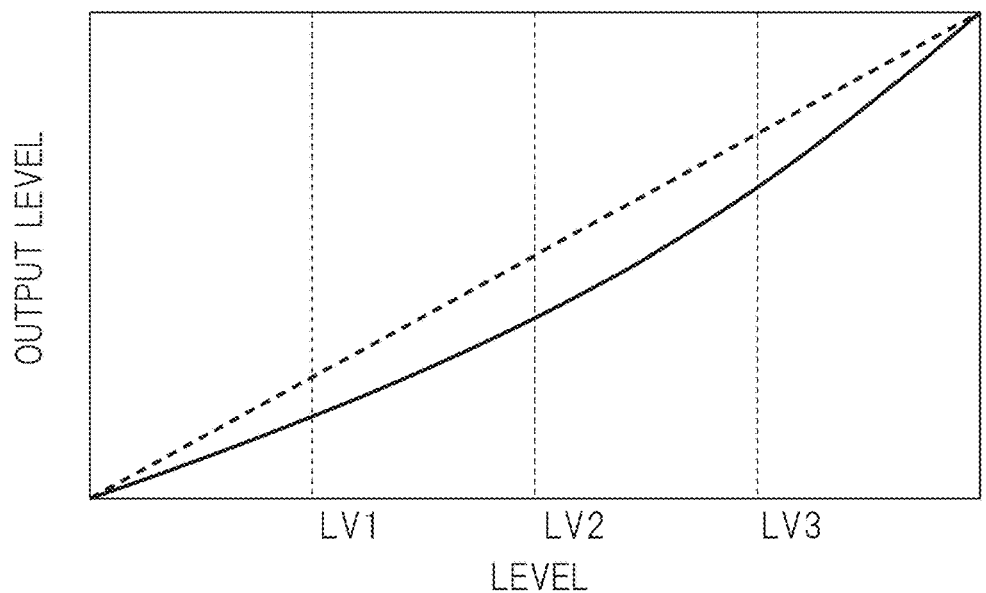
FIG. 5F is an example of an input/output property of a video.

Next, FIG. 5E illustrates an example of a histogram obtained when the luminance distribution at the luminance level LV2 or higher is larger than that at the luminance level LV2 or lower. An example of the gain control value β in this case is illustrated in FIG. 5F. As illustrated in FIG. 5F, the slope of the property curve at the LV2 or more when the luminance distribution is large is controlled to be steep as compared to the luminance level LV2 or lower, so that more output luminance levels are assigned to a luminance band having the large video distribution. Therefore, it a video having a good visibility can be obtained.

By a series of control of the video composing unit 26 described above, it is possible to obtain a video having a good visibility while taking both advantages of the Retinex processing based on the McCann 99 model excellent in illumination light estimation performance and the Retinex processing based on the MSR model excellent in contrast correction performance.

In the above description, note that a combination of the Retinex models is not limited to the above-described examples, but may be a combination of Retinex models of different methods. In addition, the combination is not limited to the combination of two models, but may be a combination of three or more models. In this case, the plurality of Retinex processing units illustrated in FIG. 2 may be configured to be arranged in parallel to compose the corrected video of each Retinex processing unit by the video composing unit 26 so as to obtain the correction video signal 13.

Second Embodiment

A second embodiment is an example which is different from the first embodiment in the operation of the video correcting unit 100 in the video display device of FIG. 1. The following is explanation for the difference from the first embodiment. Particularly, a part without the explanation is the same as that of the first embodiment, and therefore, the explanation will be omitted.

The video correcting unit 100 of the second embodiment will be described by using FIG. 2. The Figs first Retinex processing unit 20 and the second Retinex processing unit 22 perform the video processing on the internal video signal 12 based on the Retinex theories having different methods, and output the correction video signal 21 and the correction video signal 23. In the present embodiment, it is assumed that the second Retinex processing unit 22 performs a large scale of Retinex processing than that of the first Retinex processing unit 20. Here, the scale of the Retinex processing is a size of a pixel range which is referred to in the Retinex processing.

The feature analyzing unit 24 analyzes a feature of the internal video signal 12, and outputs the first video composing control signal 29 and the second video composing control signal 25 to the video composing unit 26. The video composing unit 26 composes the correction video signal 21 and the correction video signal 23 based on the video composing control signal 29 and the video composing control signal 25, and outputs the correction video signal 13.

Here, the second video composing control signal 25 and the gain control value β of the second embodiment are the same as those of the first embodiment, and thus the description thereof will be omitted.

The gain control value α by the first video composing control signal 29 of the second embodiment is different from that of the first embodiment. The following is its explanation.

Figure 6:
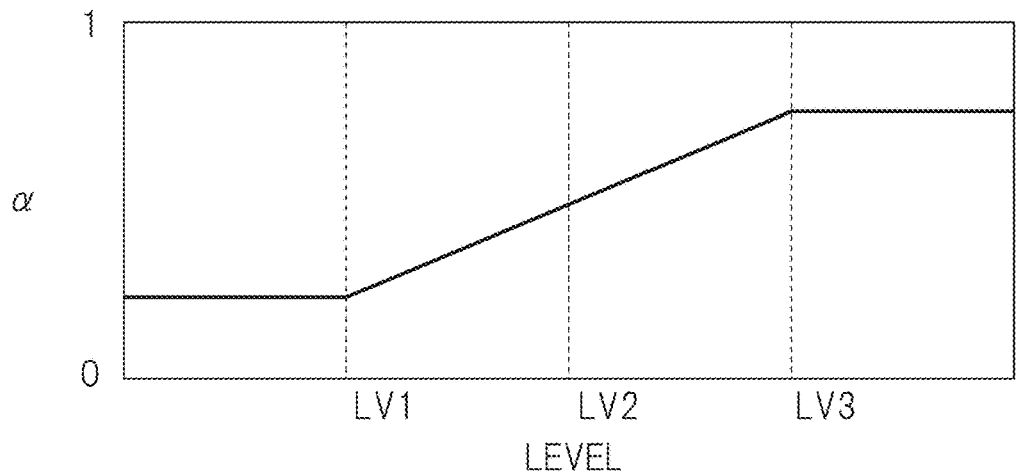
FIG. 6 is a diagram of an operational property of a feature analyzing unit.

FIG. 6 illustrates an example of the output property of the first video composing control signal in the feature analyzing unit 24 according to the second embodiment. In FIG. 6, the horizontal axis represents a luminance level of a video, and the vertical axis represents a value of the first video composing control signal 29. As illustrated in FIG. 6, for example, α becomes small when the luminance level is low, and α becomes large when the luminance level is high. By controlling the α as described above, a composition ratio can be changed in accordance with the luminance level. When the luminance level is small in the correction video signal 13 obtained by the video composing unit 26, a ratio of the second Retinex processing unit 22 can be increased. In addition, when the luminance level is large, a ratio of the first Retinex processing unit 20 can be increased. That is, a component from the first Retinex processing unit 20 having a small scale of the Retinex processing includes a lot of reflected light components having a relatively high frequency component. Therefore, by increasing the composition ratio in a video area having a high luminance, the definition of the video can be increased.

In addition, a component of the second Retinex processing unit 22 having a large scale of the Retinex processing includes a lot of reflected light components having a relatively low frequency component. Therefore, by increasing the composition ratio in a video area having a low luminance, the visibility of a shadow portion of the video can be increased. Note that the property illustrated in FIG. 6 is an example, and the maximum value, the minimum value, the slope, and others at each luminance level may be determined in accordance with the property of the Retinex processing.

In the embodiment described above, the example of generation by the video composing control signal 29 in accordance with the luminance level of the video has been described. However, the control in accordance with a frequency component may be adopted. As the case of the control in accordance with the frequency component, in a case of the high frequency component for each area of the video signal, the ratio of the video signal obtained from the Retinex processing unit having a small scale size is increased in the correction video signal 13. In a case of the low frequency component for each area of the video signal, the ratio of the video signal obtained from the Retinex processing unit having a large scale size is increased in the correction video signal 13. Furthermore, the composition control using both the luminance level and the frequency component of the video may be performed. In this case, for example, the control may be performed by the above-described control value in accordance with the luminance level and a normalization value obtained by additional or product calculation of the control value in accordance with the frequency component.

According to the second embodiment of the present invention described above, both of the definition of the video and the visibility of the shadow portion can be achieved by composing the corrected videos of the plurality of different Retinex processing in accordance with the scale of the Retinex processing.

Third Embodiment

Figure 7:
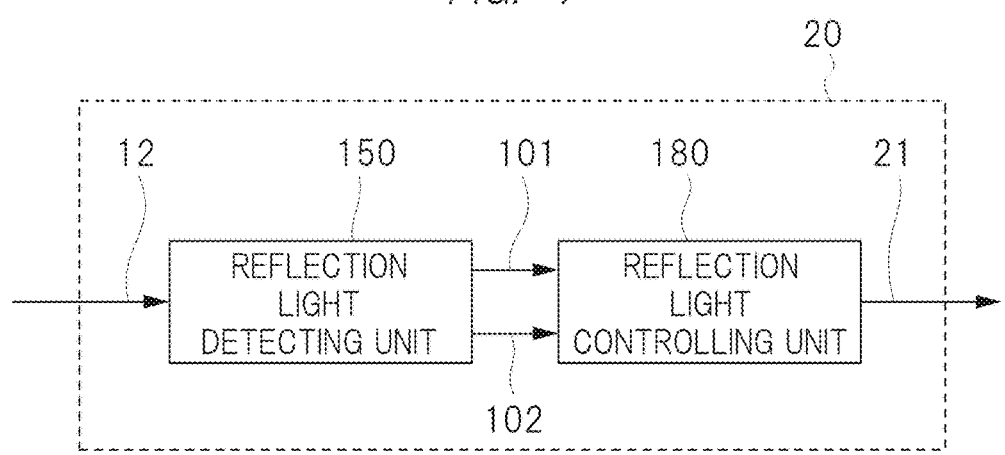
FIG. 7 is an example of a configuration of a Retinex processing unit according to a third embodiment of the present invention.

Next, the description will be made about an embodiment when a different Retinex model is used in the video correcting unit 100 in the video display device illustrated in FIG. 1. As the configuration of the video correcting unit 100, the configuration of FIG. 2 is used as an example. However, the configuration is not limited thereto. FIG. 7 illustrates a configuration example of the first Retinex processing unit 20 including: a reflected light detection unit 150 which receives the internal video signal 12 as an input signal and detects two reflected light components 101 and 102 through the video processing based on the Retinex theory; and a reflected light control unit 180 which receives the detected two reflected light components as inputs, which adjusts the reflected light, and then which outputs the correction video signal 13 through the recomposition.

Next, the reflected light detection unit 150 and the reflected light control unit 180 will be described.

In accordance with a nature of an object, the reflection of light is classified into, for example, light (hereinafter, referred to as a specular component) reflected as specular reflection on such a smooth surface as a mirror, light (hereinafter, referred to as a diffusing component) reflected as diffuse reflection by small asperity on a rough surface, and ambient light (hereinafter, referred to as an ambient component) scattered by being repeatedly reflected on the peripheral environment.

For example, in a three-dimensional computer graphic field, there is a Phong reflection model as a reflection model expressing the shadow of the surface of the object by using such natures of three types of light. According to the Phong reflection model, the material can be expressed by a magnitude of the reflection of the light.

For example, when a spot light is emitted to a plastic spherical object, a small circular highlight having a high luminance is formed. In addition, in a rubber spherical object, a radius of the highlight is wider but the luminance is lower than those of the plastic spherical object. The highlight portion is the specular component. In addition, also in the diffusing component and the ambient component, the luminance is different in accordance with the material.

Figure 10:
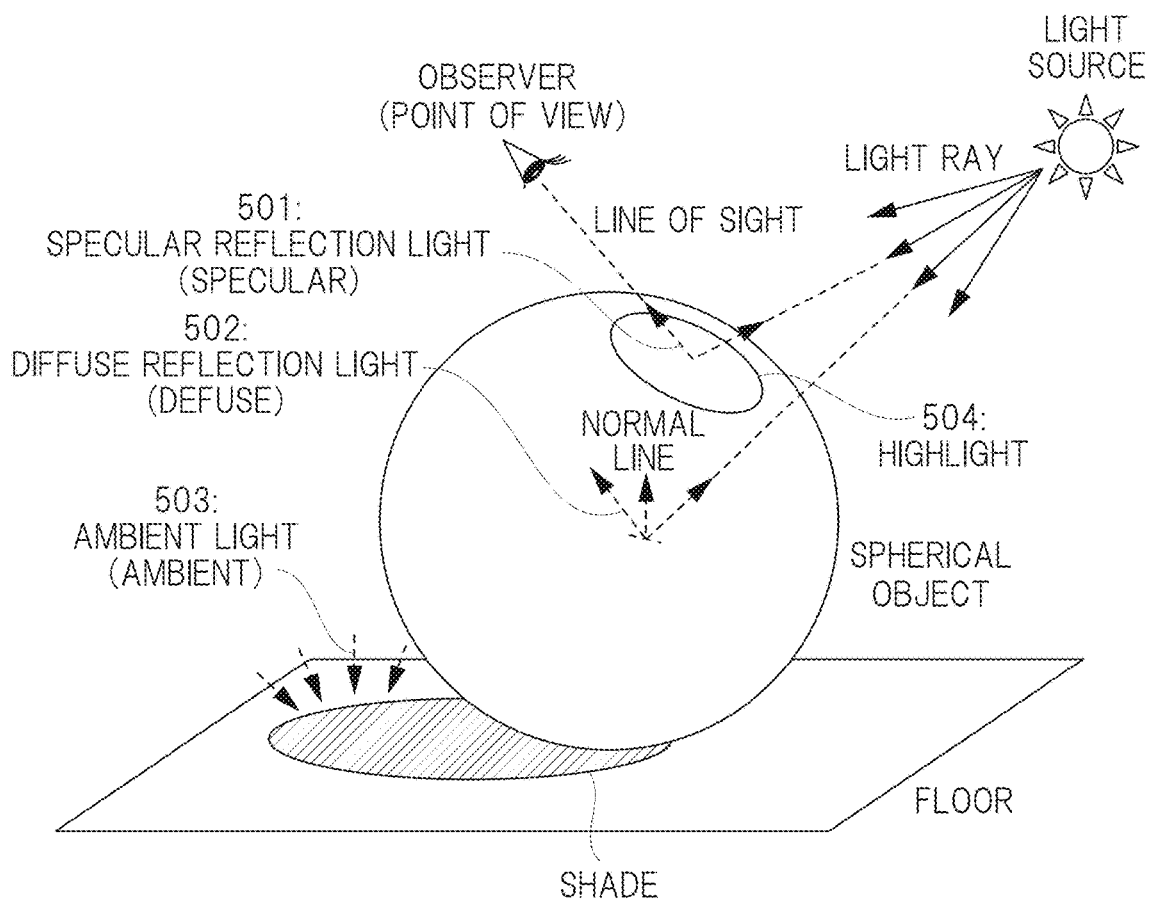
FIG. 10 is a diagram for describing a property of the reflected light according to a Phong reflection model.

FIG. 10 is a diagram for describing an example of the Phong reflection model. The drawing includes an optical source, light ray extending from the optical source, a spherical object which the light ray reaches, a floor on which the spherical object is placed, and an observer who observes the scene. The observation is performed at a position of the viewpoint, and may be performed by actual observation through eyes, and may use an observation machine such as a camera.

The specular component in FIG. 10 is light 501 obtained by reflection of a light ray on the surface of the spherical object in a line-of-sight direction. The component is formed by the reflection of the light ray on the spherical object, and a circular highlight 504 in the drawing is a region of the specular component. For example, in the case of the plastic spherical object, a small circular highlight having a high luminance is formed. In addition, in the case of the rubber spherical object, the radius of the highlight is wider and the luminance is lower than those of the plastic one. In the Phong reflection model, it is assumed that the specular component follows the power of cosine between the line of sight and the reflected light.

The diffusing component in FIG. 10 is the diffused reflection light of light 502 obtained by the hitting of the light ray onto the spherical object. The luminance of the diffusing component is determined by direction of the light ray and the spherical object, that is, by cosine between the light ray and a normal line, and therefore, a portion of the spherical object on which the light directly hits becomes a region of the diffusing component.

The ambient component in FIG. 10 is light 503 which goes around the shadow portion. The component is the light which is the scattered light reflected on the peripheral environment several times, averaged by the peripheral environment, and left. Therefore, even the shadow portion which the light does not directly reach has a constant luminance. The brightness of the diffused reflection light forming the shadow is determined by cosine between the light ray and the direction of the surface of the spherical object, that is, cosine between a vector of the light ray and a normal line.

From the above description, the Phong reflection model is shown as Mathematical Expression 1.

[Mathematical Expression 1]

$$I = k_d \sum_{j=1}^{l} (\vec{N} \cdot \vec{L}) m_d + k_s \sum_{j=1}^{l} (\vec{R} \cdot \vec{V})^n I_j + I_a$$

Accordingly, the reflected light in the reflected light detection unit according to the present embodiment is assumed to include the ambient component, the diffusing component, and the specular component, and it is assumed that the ambient component in the video follows a Gaussian distribution having a wide scale, the diffusing component follows a luminance distribution based on cosine, and the specular component follows a luminance distribution based on the power of cosine. When it is assumed that a filter of the ambient component is set to Fa(x, y), a filter of the diffusing component is set to Fd(x, y), and a filter of the specular component is set to Fs(x, y), each filter is as Mathematical Expression 2 to Mathematical Expression 4.

[Mathematical Expression 2]

$$F_a(x, y) = \frac{1}{\sqrt{2\pi}\sigma} e^{-\frac{x^2+y^2}{2\sigma^2}}$$

[Mathematical Expression 3]

$$F_d(x, y) = \cos\left(\frac{\pi\sqrt{x^2+y^2}}{k}\right) / N$$

[Mathematical Expression 4]

$$F_s(x, y) = \cos^n\left(\frac{\pi\sqrt{x^2+y^2}}{k}\right) / N^n$$

Figure 11A:
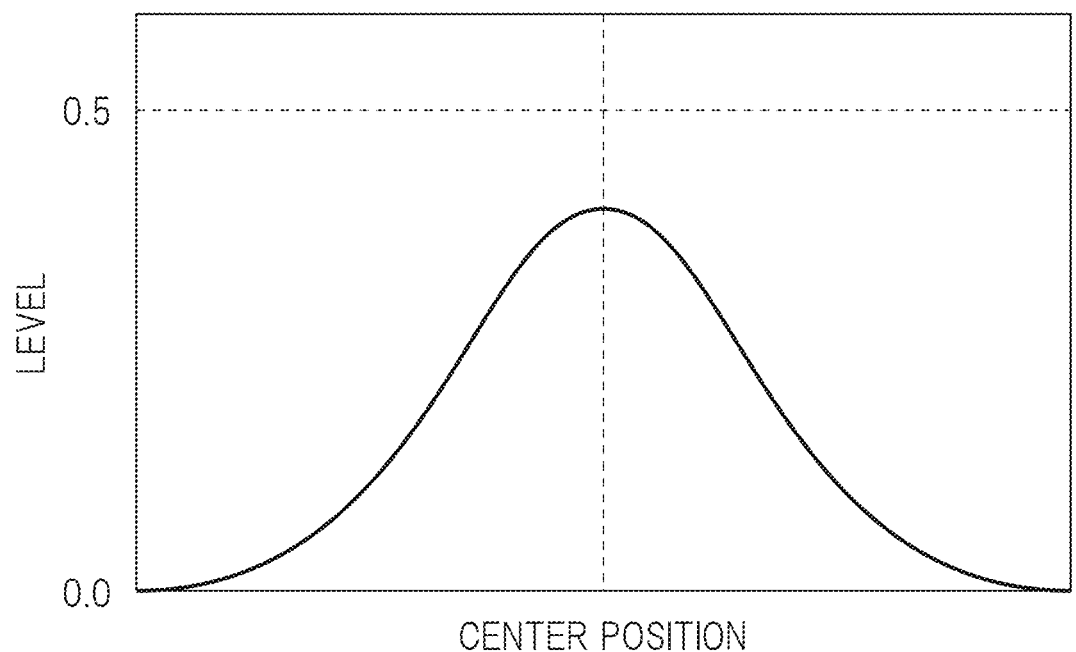
FIG. 11A is a diagram for describing a Gaussian distribution.
Figure 11B:
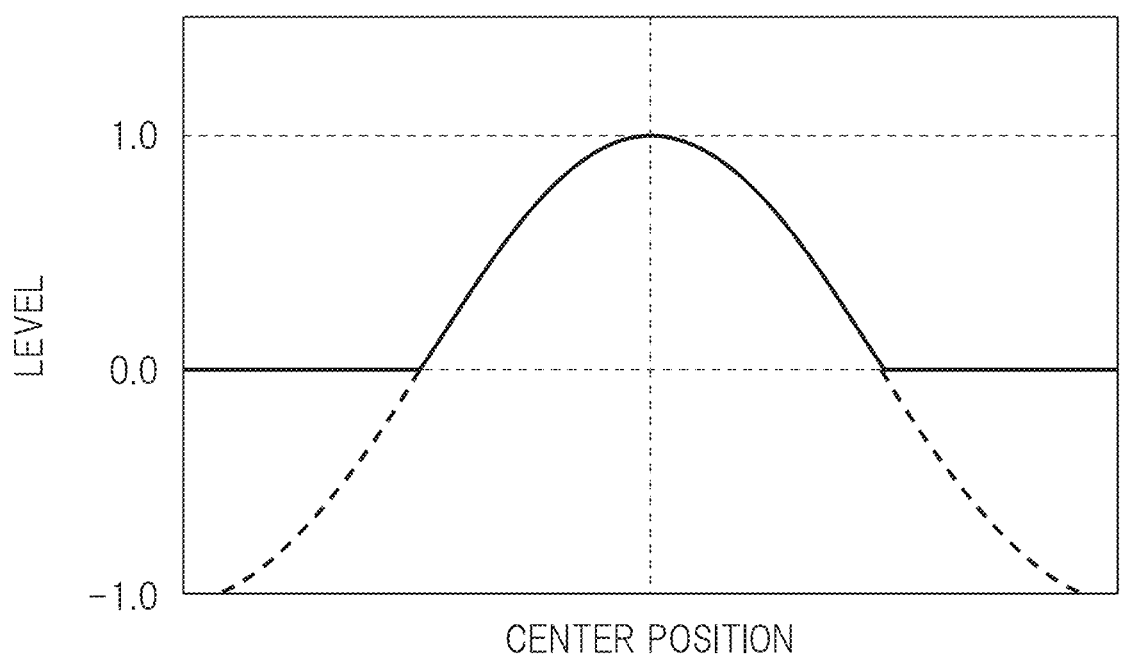
FIG. 11B is a diagram for describing a luminance distribution based on a cosine.
Figure 11C:
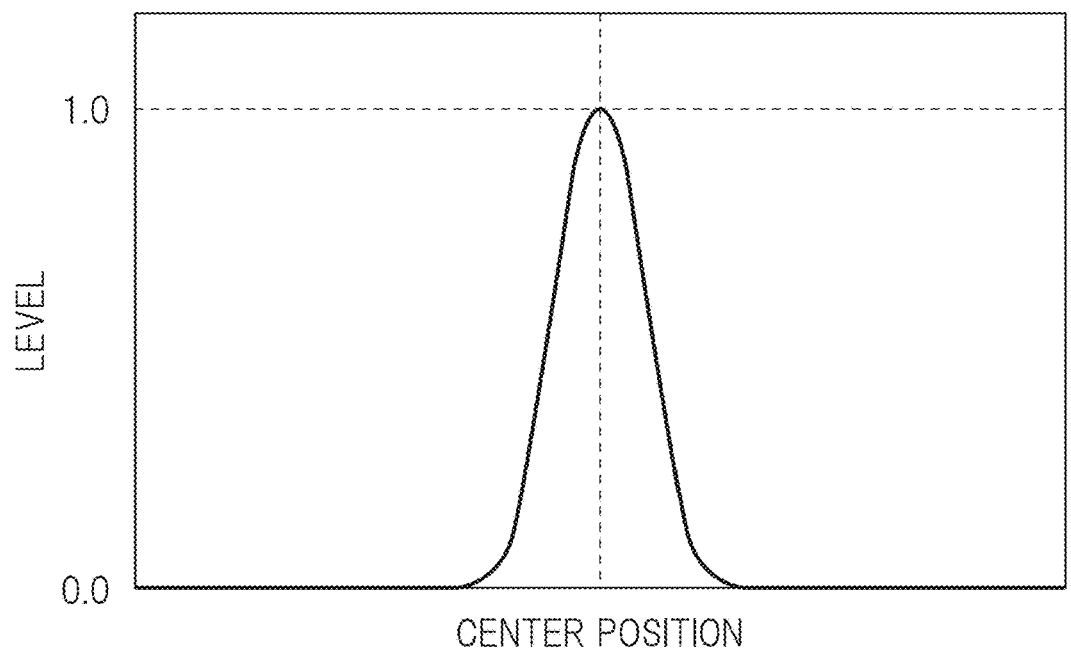
FIG. 11C is a diagram for describing a luminance distribution based on the power of cosine.

In addition, FIGS. 11A, 11B, and 11C are diagrams for describing the distributions of the ambient component, the diffusing component, and the specular component each expressed with the luminance level on a vertical axis and with a one-dimensional positional coordinate on a horizontal axis. In this manner, it can be seen that the levels of the distributions of the diffusing component and the specular component are steeped more than that of the Gaussian distribution of the ambient component.

Here, a video "Ia" by the filter of the ambient component is entirely averaged, and therefore, the video contains almost only the ambient component. In a video "Id" by the filter of the diffusing component, the specular component is averaged by the filter, and the video contains almost only the ambient component and the diffusing component. A video "Is" by the filter of the specular component is not almost averaged, and therefore, all of the ambient component, the diffusing component, and the specular component are left. This point is expressed by Mathematical Expression 5.

Ambient=$I_a$, Diffuse=$I_d$–$I_a$, Specular=$I_s$–$I_d$ [Mathematical Expression 5]

In this point, when a reflection component by a logarithm space is obtained as similar to the MSR, Mathematical Expression 6 is obtained.

$R_{phong,i}(x,y)=W_d R_{Diffuse,i}(x,y)+W_s R_{Specular,i}(x,y)$ $R_{Specular,i}(x,y)=\log \bar{I}_{s,i}(x,y)-\log \bar{I}_{d,i}(x,y)=\log[F_s(x,y)\otimes I(x,y)]-\log[F_d(x,y)\otimes I(x,y)]$ $R_{Diffuse,i}(x,y)=\log \bar{I}_{d,i}(x,y)-\log \bar{I}_{a,i}(x,y)=\log[F_d(x,y)\otimes I(x,y)]-\log[F_a(x,y)\otimes I(x,y)]$ [Mathematical Expression 6]

In addition, the specular component of a mirror, a metal plate, and others is considered to be total reflection, and therefore, the power of cosine is infinite. At this time, for the reflection component based on the specular component, Mathematical Expression 7 may be used.

$R_{Specular,i}(x,y)=\log I(x,y)-\log[F_d(x,y)\otimes I(x,y)]=\log I_i(x,y)-\log \bar{I}_{d,i}(x,y)$ [Mathematical Expression 7]

In addition, the ambient component is the average light of the entire environment, and therefore, a mean filter or an average luminance may be used instead of the Gaussian filter. For example, when the average luminance is used, Mathematical Expression 8 can be obtained.

$R_{Diffuse,i}(x,y)=\log \bar{I}_{d,i}(x,y)-\log[\Sigma I(x,y)/num]=\log \bar{I}_{d,i}(x,y)-\log \bar{I}_{a,i}(x,y)$ [Mathematical Expression 8]

Figure 12A:
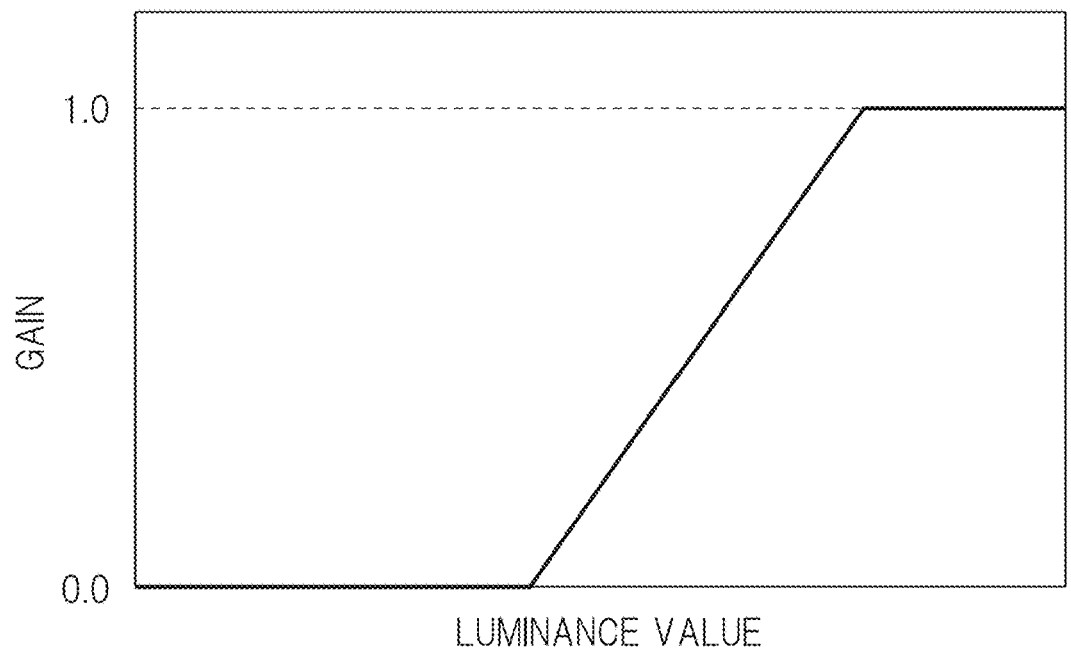
FIG. 12A is a diagram for describing a specular correction gain based on a luminance value of a video.

In addition, the specular component is highly visible at the highlight having a high luminance in many cases, and the diffusing component may be a middle or lower luminance in many cases. Accordingly, for example, a gain of a high luminance area as illustrated in FIG. 12A may be added to the specular component Rspecular of Mathematical Expression 6, and a gain of a middle or lower luminance area as illustrated in FIG. 12B may be added to the diffusing component Rdiffuse. Here, in a case of assumption that the input/output curve of FIG. 12A is set to "g(I)", the gain becomes 0 when an input luminance "I" is a low luminance, the gain is gradually increased from a middle luminance, and the gain becomes 1 when the input luminance is a high luminance. When it is assumed that he input/output curve of FIG. 12B is set to "1–g(I)", the gain is 1 when the luminance is low, the gain is gradually decreased from the middle luminance, and the gain becomes 0 when the luminance is high.

In addition, as similar to the example of the MSR, when a gain and an exponential function are added to Mathematical Expression 6 after the weighted average, a homomorphic filter can be obtained. For such a homomorphic filter, a logarithm function and an exponential function may be approximated by, for example, a function using a power method and the inverse function thereof. In this case, Mathematical Expression 9 is obtained when the function is set to "f".

$R_{phong,i}(x,y)=W_d R_{Diffuse,i}(x,y)+W_s R_{Specular,i}(x,y)$ $R_{Specular,i}(x,y)=f(F_s(x,y)\otimes I(x,y))-f(F_d(x,y)\otimes I(x,y))=f(\bar{I}_{s,i}(x,y))-f(\bar{I}_{d,i}(x,y))$ $R_{Diffuse,i}(x,y)=f(F_d(x,y)\otimes I(x,y))-f(F_a(x,y)\otimes I(x,y))=f(\bar{I}_{d,i}(x,y))-f(\bar{I}_{a,i}(x,y))$ [Mathematical Expression 9]

As described above, by using the Phong reflection model, the correction is performed in consideration of the nature of reflection.

Mathematical Expression 9 will be described by using FIGS. 8 and 9.

Figure 8:
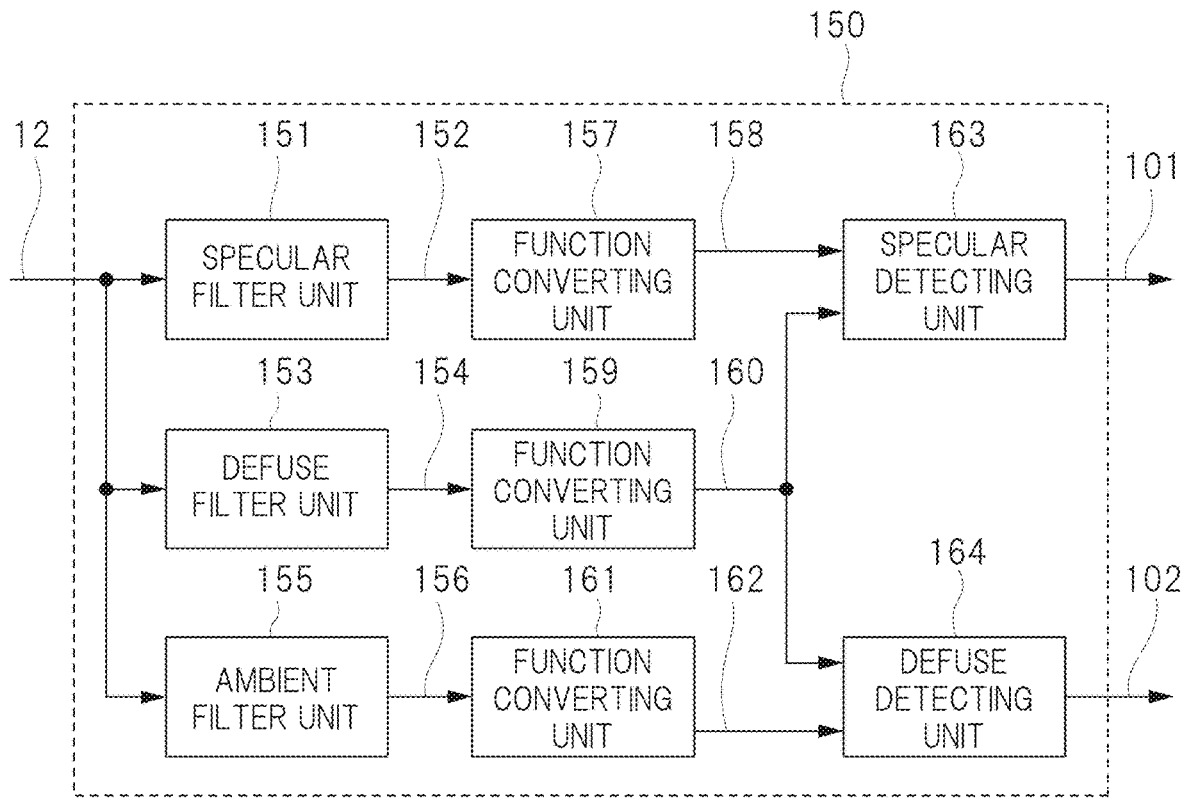
FIG. 8 is an example of a configuration of a reflected light detecting unit.

FIG. 8 is a diagram for describing a process of the reflected light detection unit according to the third embodiment. The reflected light detection unit 150 includes a specular filter unit 151, a diffusion filter unit 153, an ambient filter unit 155, function converting units 157, 159, and 161, a specular detection unit 163, and a diffusion detecting unit 164. Note that the function converting unit may perform approximation using a logarithm function or a function of a power.

Figure 9A:
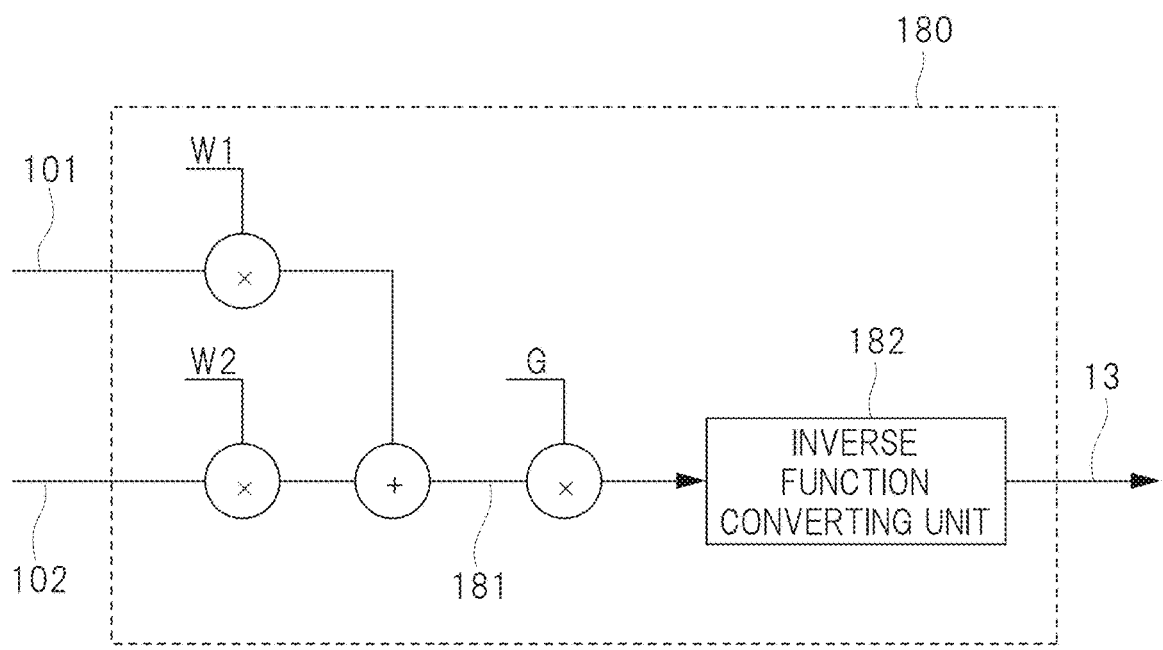
FIG. 9A is an example of a configuration of a reflected light controlling unit.
Figure 9B:
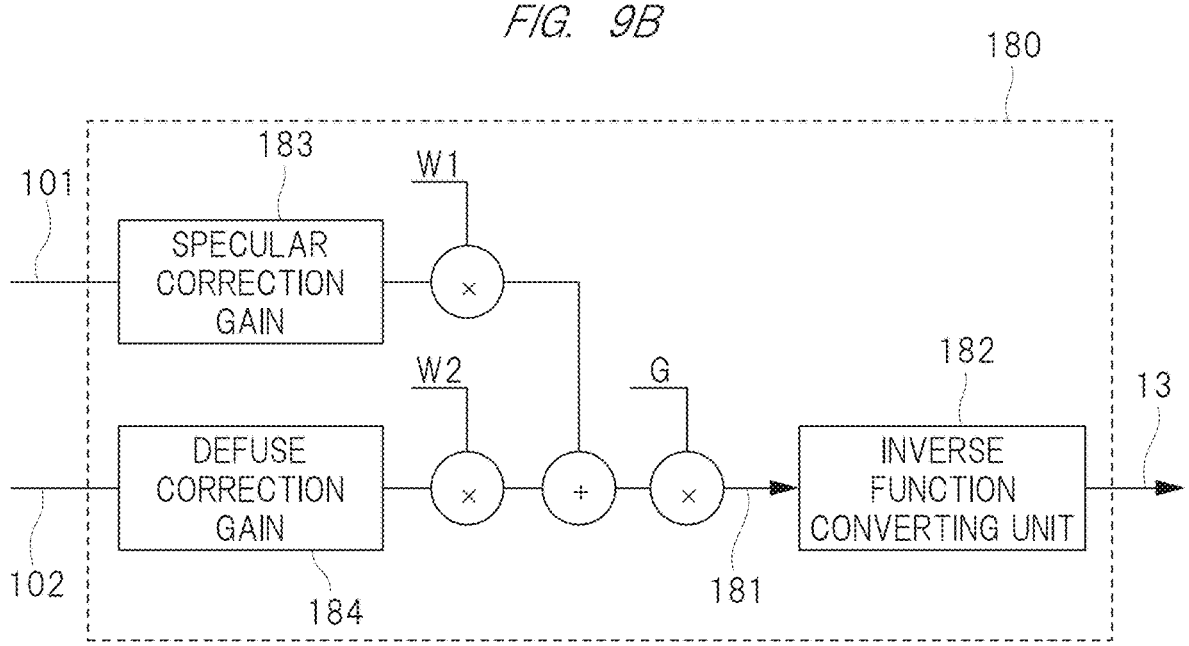
FIG. 9B is an example of a configuration of the reflected light controlling unit.

FIG. 9A is a diagram for describing a process of the reflected light control unit according to the first embodiment. The reflected light control unit 180 may be configured with the weighted average of weights W1 and W2, and may be configured with the weighted average of the weights W1 and W2, a gain G, and an inverse function converting unit 182. However, the inverse function converting unit is configured with a function inverse to the function used in the function converting unit. In addition, as illustrated in FIG. 9B, a specular correction gain 183 which has a high gain in the high luminance region of FIG. 12A and a diffusion correction gain 184 which has a high gain in the middle or lower luminance region of FIG. 12B may be added to the configuration of FIG. 9A.

According to the above configuration, when the reflected light component is extracted, the video is decomposed for each nature of reflection of the light, that is, for each of the specular component, the diffusing component, and the ambient component, and a correction amount is changed in accordance with each nature, so that the first correction video signal 21 having a high texture in consideration of the material of the object in the video can be obtained from the first Retinex processing unit 20.

Next, the second Retinex processing unit 22 is assumed to perform a video correction using the MSR model. At this time, a process having a larger scale size than that of the above-described the first Retinex processing unit 20 is performed.

With such a configuration described above, the first correction video signal 21 becomes a video signal in consideration of the nature of the object, and the second correction video signal 23 becomes a video signal subjected to the contrast correction in a relatively large area of the video. These correction video signals are subjected to composition as similar to the operation of the video composing unit 26 described in the second embodiment. In this manner, since a ratio of the second correction video signal is large in a region of the low luminance level of the video, a contrast improving effect is increased. Further, since a ratio of a video correction signal in consideration of the nature of the object is large in a region of the high luminance level of the video, a video having a good visibility can be obtained over the entire region of the luminance level of the video as the correction video signal 13.

According to the third embodiment of the present invention described above, an output video having a higher texture in addition to the effect of the second embodiment described above can be obtained.

Fourth Embodiment

A fourth embodiment will exemplify a video display device which corrects a video by decomposing the video for each light reflection property with reference to the arrangement of a projector. Note that the following will exemplify a front projector. However, a rear projection television may be another form of the projector. In addition, a display device using a direct-view flat-panel display designed not to perform enlarged projection on the panel, such as a liquid crystal display, plasma display, or organic EL display may be applied. This point applies to any of embodiments to be described below.

Figure 13:
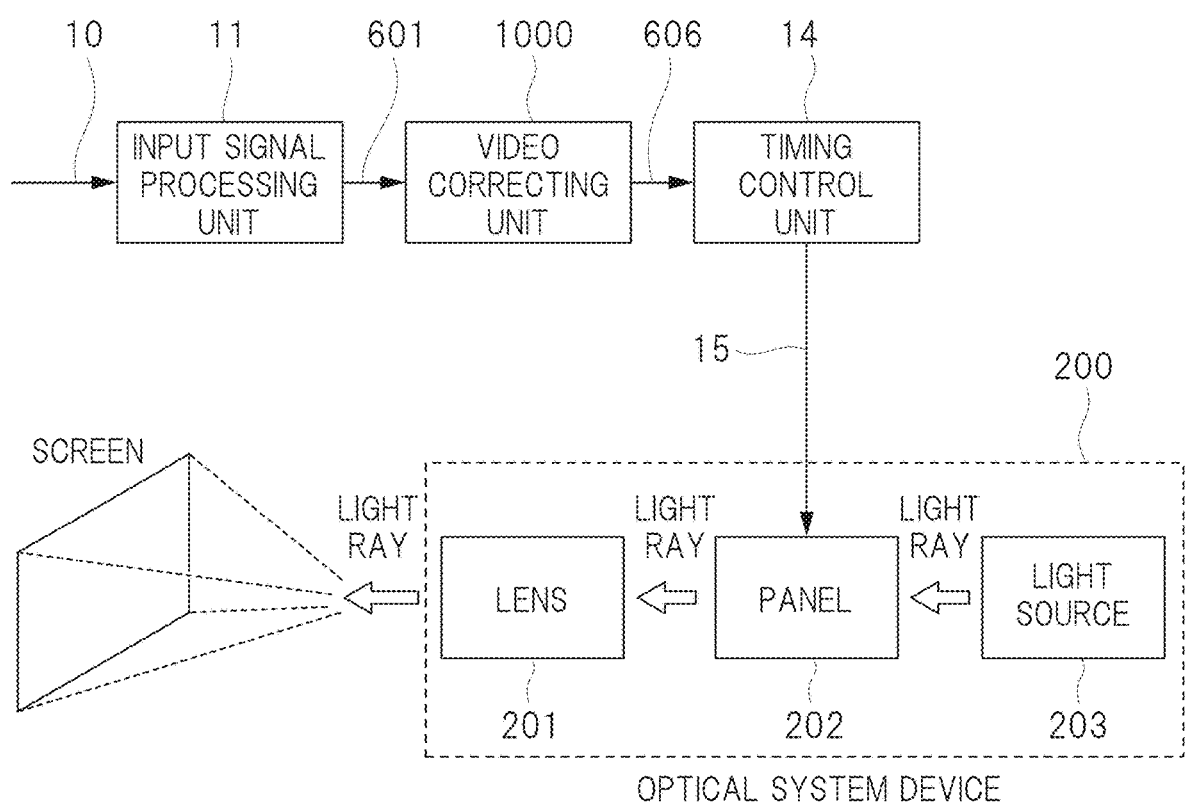
FIG. 13 is an example of a configuration diagram of a video display device according to a fourth embodiment of the present invention.

FIG. 13 illustrates an example of the arrangement of a video display device according to the fourth embodiment.

This video display device includes an input signal processing unit 11 which receives a video input signal 10 and converts the video input signal into an internal video signal 601 by, for example, a compressed video signal decoder, IP conversion, or scalar, a video correcting unit 1000 which receives the internal video signal 601, a timing control unit 14 which receives an output video signal 606 and generates a display control signal 15 based on the corrected video and horizontal/vertical signal synchronization signals for a display screen, and an optical system device 200 which displays a video. Note that the video correcting unit 1000 may be simply expressed as a video processing unit.

The optical system device 200 includes a light source 203 which emits a light ray for projecting a video on the screen, a panel 202 which receives the display control signal 15, adjusts the tone of the light ray from the light source 203 for each pixel, and generates a projection video, and a lens 201 for the enlarged projection of the projection video onto the screen.

When the video display device is a direct-view flat-panel display such as a liquid crystal display, a plasma display, or an organic EL display, the lens 201 of the optical system device 200 is not required. The user directly views the panel 202.

Figure 14:
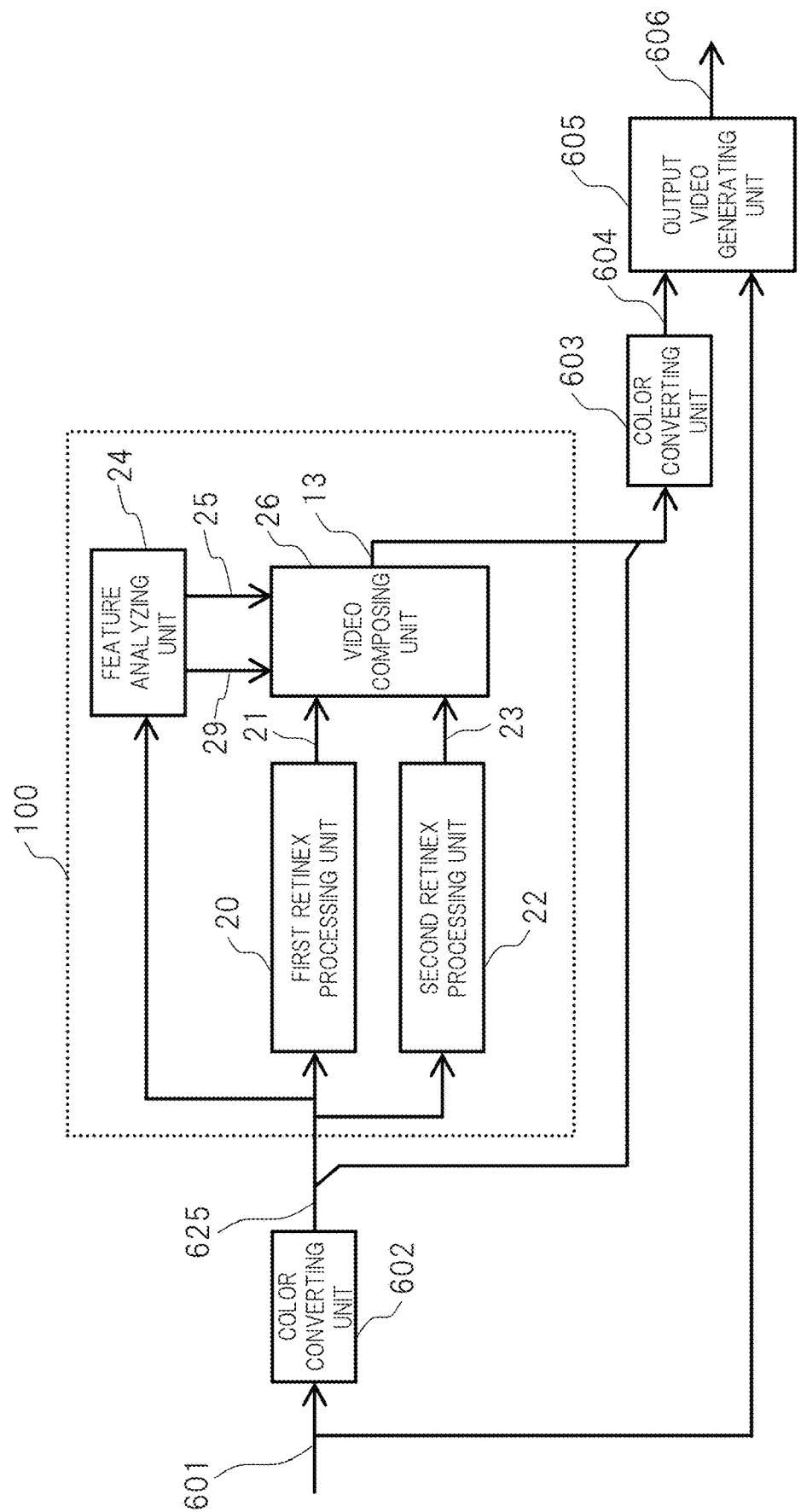
FIG. 14 is an example of a configuration of a video correcting unit.

FIG. 14 illustrates an example of the arrangement of the video correcting unit 1000. A color converting unit 602 converts the internal video signal 601 input in the RGB format into, for example, a signal in the YUV format, and outputs it as an internal video signal 625. In this case, the format of the internal video signal 625 is not limited to the YUV format as long as it can be converted into a luminance signal Y and color signals. A first Retinex processing unit 20 and a second Retinex processing unit 22 perform video processing based on the Retinex theory with respect to the luminance signal Y of the internal video signal 625 and respectively output a first corrected video signal 21 and a second corrected video signal 23. Since the operations the first Retinex processing unit 20 and the second Retinex processing unit 22 are the same as those in the first embodiment, a detailed description of them will be omitted.

A feature analyzing unit 24 analyzes the features of the internal video signal 625 and outputs a first video combining control signal 29 and a second video composing control signal 25 to a video combining unit 26. The video combining unit 26 outputs the corrected video signal 13 by combining the corrected video signal 21 and the corrected video signal 23 based on the first video combining control signal 29 and the second video composing control signal 25. The operation of the video combining unit 26 is the same as the example described in the first embodiment, and a detailed description of it will be omitted. A color converting unit 603 converts a corrected video signal 13 into a corrected video signal 604 in the RGB format by using the luminance signal Y of the corrected video signal 13 and a color signal UV of the internal video signal 625. At this time, a timing difference in terms of videos may occur between the corrected video signal 13 and the internal video signal 625 depending on the processing arrangements of the respective Retinex processing units and the video combining unit 26. In this case, the corrected video signal 13 is converted into the corrected video signal 604 by correcting this timing difference.

Figure 15:
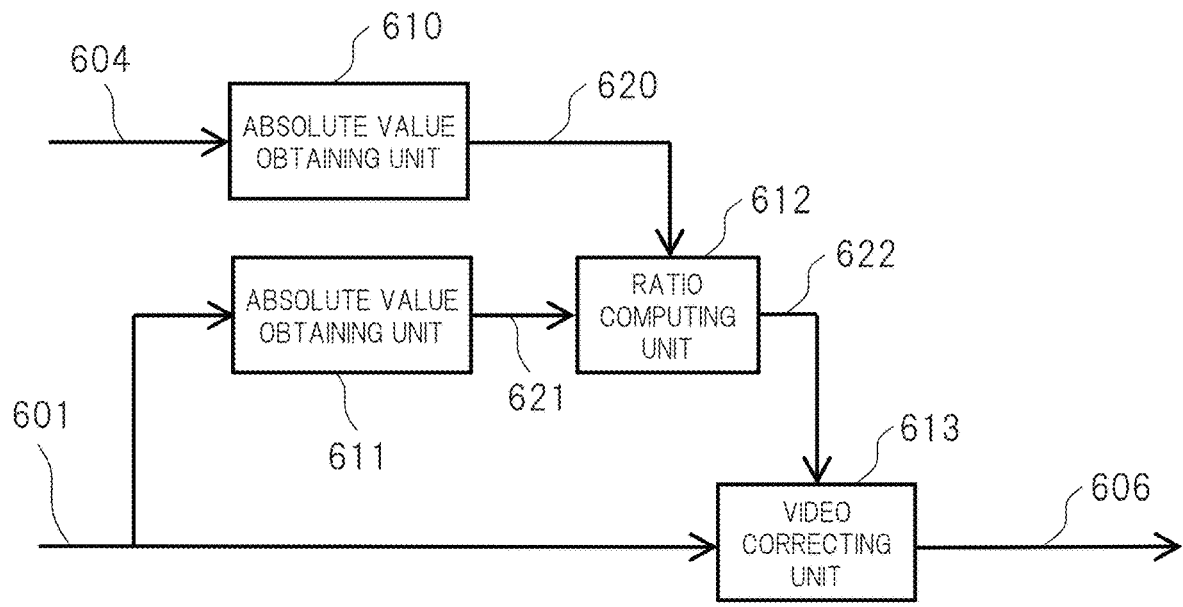
FIG. 15 is an example of a configuration of an output video generating unit.

An output video generating unit 605 corrects the internal video signal 601 based on the ratio in video signal level between the internal video signal 601 and the corrected video signal 604, and outputs the resultant signal as the output video signal 606. FIG. 15 illustrates an example of the arrangement of the output video generating unit 605. An absolute value obtaining unit 610 calculates the absolute value of a video level from the R, G, and B components of the corrected video signal 604, and outputs a video level signal 620. An absolute value obtaining unit 611 calculates the absolute values of video levels from the R, G, and B components of the internal video signal 601, and outputs a video level signal 621. A ratio computing unit 612 obtains the ratio in magnitude between the video level signal 620 and the video level signal 621, and outputs a corrected ratio signal 622. A video correcting unit 613 outputs the output video signal 606 by correcting the internal video signal 601 based on the corrected ratio signal 622. More specifically, the video correcting unit 613 corrects the internal video signal 601 by multiplying each of the R, G, and B components by the corrected ratio signal 622.

Figure 16:
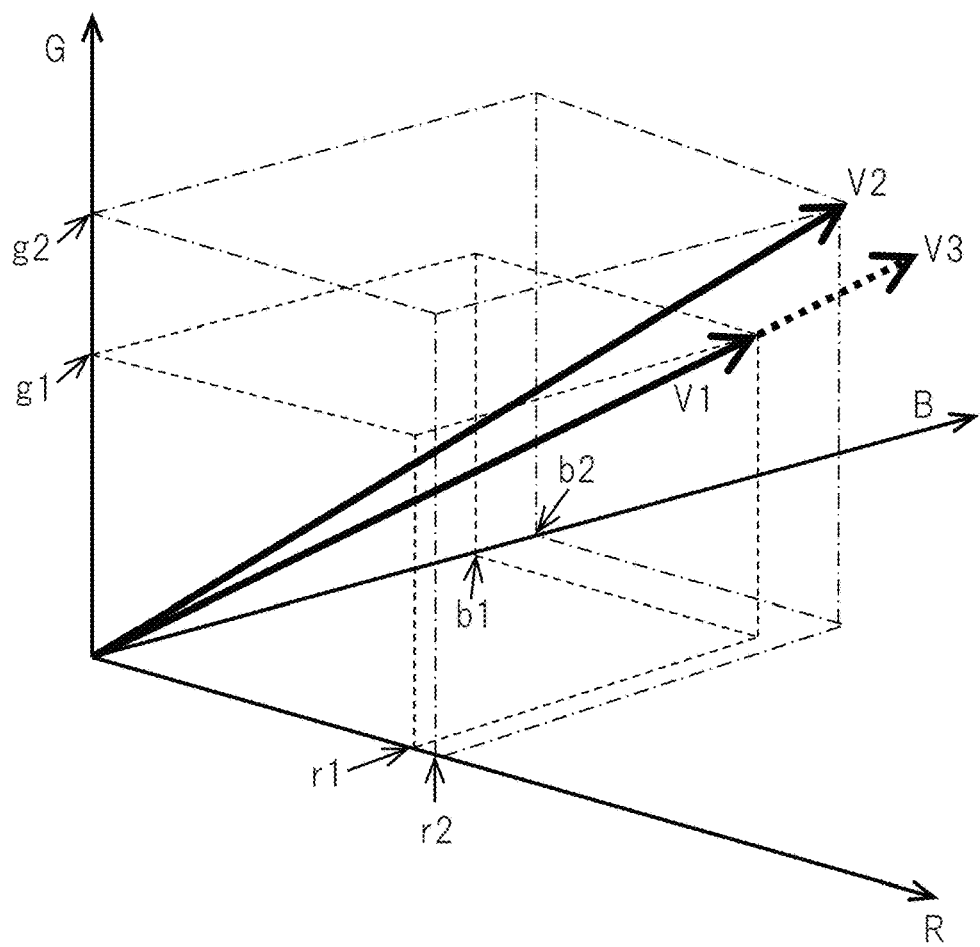
FIG. 16 is an example of a video signal level.

FIG. 16 illustrates an example of specific correction. FIG. 16 illustrates the R, G, and B levels of video signals on the R, G, and B axes in an RGB color space. When the R, G, and B levels of the internal video signal 601 are given by (r1, g1, b1), a vector V1 indicated by an arrow (solid line) is obtained. In this case, the vector V1 has the information of the ratios r among a plurality of color parameters of the internal video signal 601. Likewise, when the levels of the corrected video signal 604 are given by (r2, g2, b2), a vector V2 indicated by an arrow (solid line) is obtained. Assume that the absolute value obtaining units 610 and 611 respectively obtain the video level signals 620 and 621 by obtaining the absolute values of the vectors from the respective R, G, and B components, i.e., the lengths of the vectors V1 and V2. The ratio computing unit 612 obtains the ratio in magnitude between the absolute values of the video levels. The video correcting unit 613 then performs multiplication by using the obtained ratio as shown in Mathematical Expression 10.

Output video signal 606=$V1$*(video level 620÷video level 621)

$V1=(r1,g1,b1)$ [Mathematical Expression 10]

A vector V3 indicated by the broken line in FIG. 16 represents the output video signal 606 obtained in this manner. That is, this vector has the same direction as the vector V1, and hence the ratios among the plurality of color parameters of the internal video signal 601 are maintained. This makes it possible to obtain a video with good visibility while holding the same color shade as that represented by the internal video signal 601.

This processing has been described as "corrects the internal video signal 601". The processing can also be expressed as generating a new output video signal based on the vector of the R, G, and B levels of the internal video signal 601, its absolute value, the vector of the R, G, and B levels of the corrected video signal 604, and its absolute value.

The video correcting processing by the output video generating unit 605 has been described above by taking, as an example, the correction of the internal video signal 601 by using the ratios among the absolute values of the R, G, and B levels of the internal video signal 601 and the corrected video signal 604. However, it is also possible to correct the internal video signal 601 by using the ratio of a luminance signal (Y).

Figure 17:
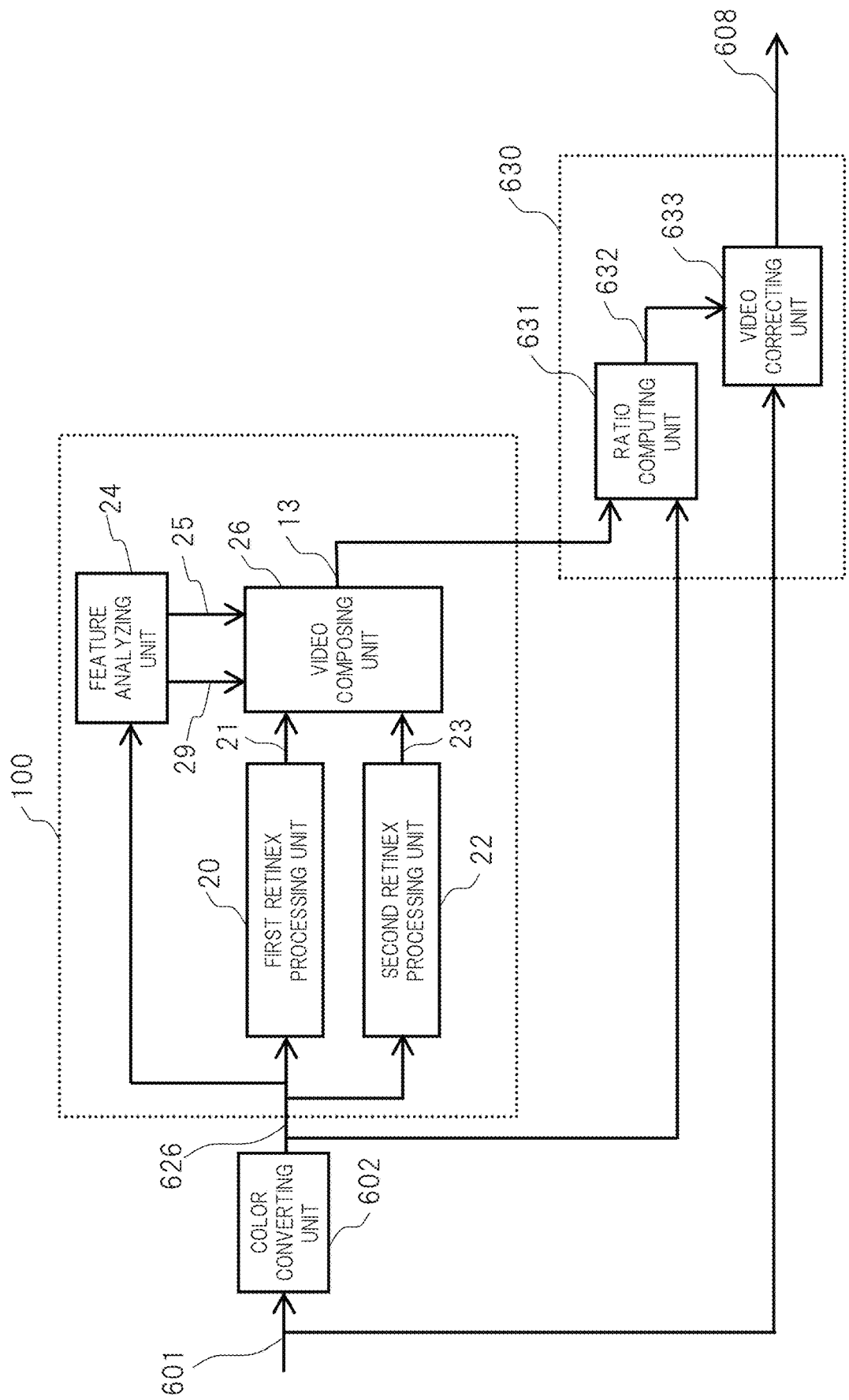
FIG. 17 is an example of a configuration of a video correcting unit according to a fourth embodiment of the present invention.

FIG. 17 illustrates an example of the arrangement of the video correcting unit 1000 in this case. The color converting unit 602 outputs an internal video signal 626 from the internal video signal 601 in the RGB format. Since the operations of the first Retinex processing unit 20, the second Retinex processing unit 22, the feature analyzing unit 24, and the video combining unit 26 are the same as those described above, a description of them will be omitted. A ratio computing unit 631 of an output video generating unit 630 obtains the ratio between the level of the corrected luminance signal 13 and the luminance signal level of the internal video signal 626, and outputs a corrected ratio signal 632. A video correcting unit 633 corrects the internal video signal 601 based on the corrected ratio signal 632 and outputs an output video signal 608. More specifically, the video correcting unit 633 corrects the internal video signal 601 by multiplying each of the R, G, and B components by the corrected ratio signal 632. This arrangement example can also obtain a video with good visibility while holding the same color shade as that represented by the internal video signal 601.

The video display device according to the sixth embodiment described above can generate a new video signal based on information concerning the color of a video signal before video correction by Retinex processing (vector information in the color space or the information of the ratios among a plurality of color parameters) and the information of ratios among absolute values or luminances of color space vectors before and after video correction by Retinex processing. This makes it possible to generate and display a video signal close to the color balance before Retinex processing while obtaining the effect of improving visibility by means of Retinex processing.

Fifth Embodiment

In the present embodiment, an example in which a visibility improving process is dynamically controlled with respect to an input video for the video display device according to the first to fourth embodiments of the present invention by using a gain of the visibility improving process in which Retinex processing performed for each pixel is used will be described.

Unlike a general dynamic contrast control applied to the entire screen, by using a gain that emphasizes a visibility improvement effect of the Retinex processing for each pixel that has been described in the first to fourth embodiments described above, it is possible to dynamically control the gain of the visibility improving process for each pixel in conjunction with the brightness of a scene of a video.

This is different from the effect in a case where a dynamic contrast control simply applied to the entire screen is combined in the subsequent stage or the previous stage of the video correcting process of the video correcting unit in the first to fourth embodiments described above. That is, this is because the dynamic contrast control applied to the entire screen cannot emphasize the visibility improvement effect of Retinex processing, which differs for each pixel, for each pixel.

Hereinafter, details of an example in which the visibility improving process is dynamically controlled with respect to an input video by using the gain of the visibility improving process in which the Retinex processing performed for each pixel is used will be described.

Figure 18:
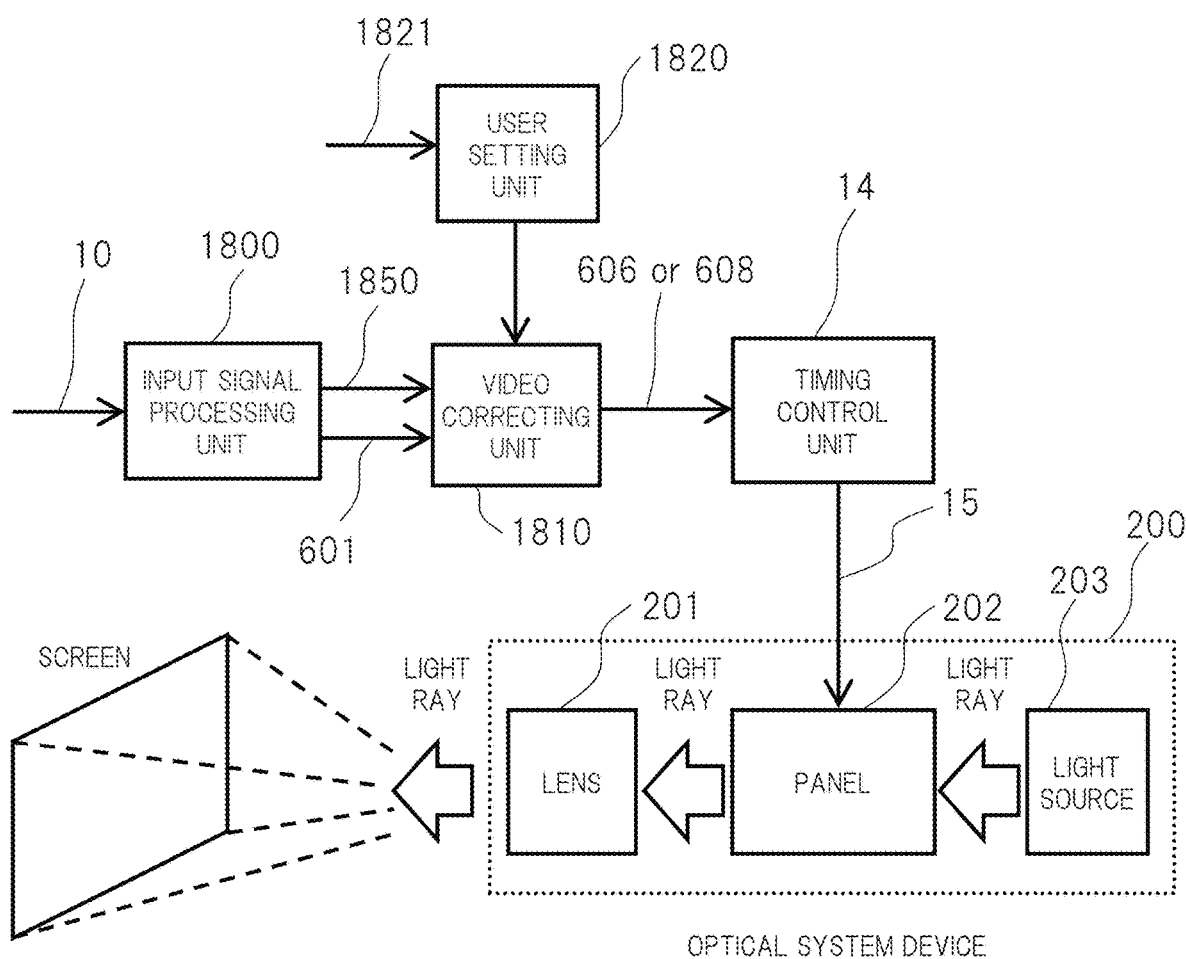
FIG. 18 is an example of a configuration diagram of a video display device according to a fifth embodiment of the present invention.

FIG. 18 illustrates an example of a configuration diagram of a video display device according to a fifth embodiment of the present invention. The present embodiment is an example improved based on the video display device according to the fourth embodiment of the present invention among the first to fourth embodiments of the present invention. Therefore, the same reference numeral is applied to the same processing unit as that of the video display device according to the fourth embodiment. The configuration of the video display device according to the fourth embodiment and the processing thereof have already been described in the first to fourth embodiments. Thus, the repetitive description thereof will be omitted.

An input signal processing unit 1800 illustrated in FIG. 18 calculates APL (Average Picture Level=average pixel value level) information 1850, which is an average pixel value of the entire input video. The input signal processing unit 1800 transmits the calculated APL information 1850 to a video correcting unit 1810.

A user setting unit 1820 illustrated in FIG. 18 receives an operation signal 1821 that is an operation input from a user, and allows user setting of each item by displaying a setting menu screen (will be described later) in accordance with the operation signal 1821. Details of the setting menu screen will be described later.

Next, a configuration of the video correcting unit 1810 of FIG. 18 will be described with reference to FIG. 19 and FIG. 20.

Figure 19:
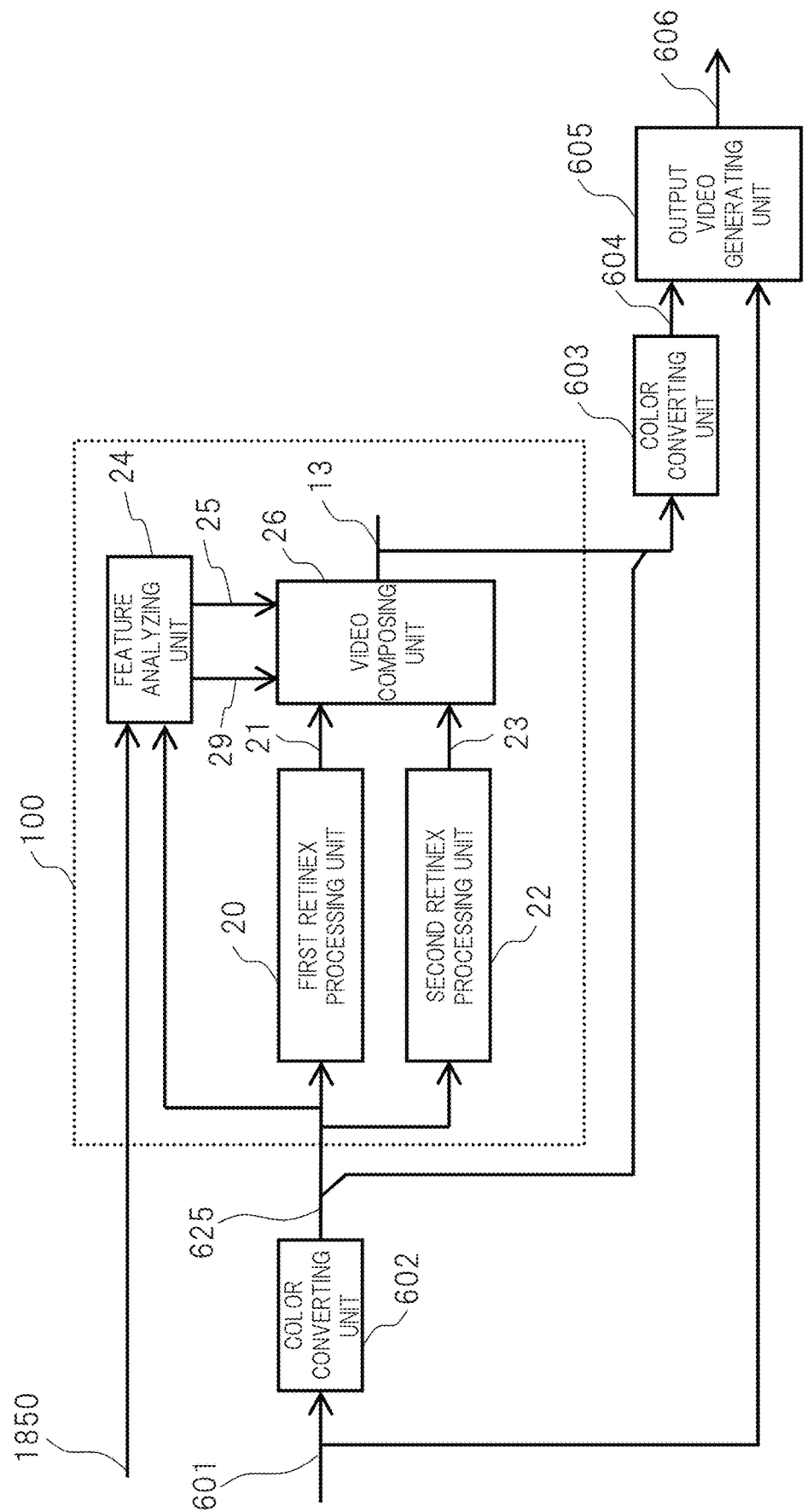
FIG. 19 is an example of a configuration of a video correcting unit.

As the configuration of the video correcting unit 1810, for example, the configuration illustrated in FIG. 19 in which the configuration illustrated in FIG. 14 according to the fourth embodiment is improved may be used. Unlike the video correcting unit illustrated in FIG. 14, the video correcting unit illustrated in FIG. 19 is configured so as to be capable of obtaining the APL information 1850 from the input signal processing unit 1800. A feature analyzing unit 24 for the APL information 1850 can perform processing using the APL information 1850 obtained from the input signal processing unit 1800.

Figure 20:
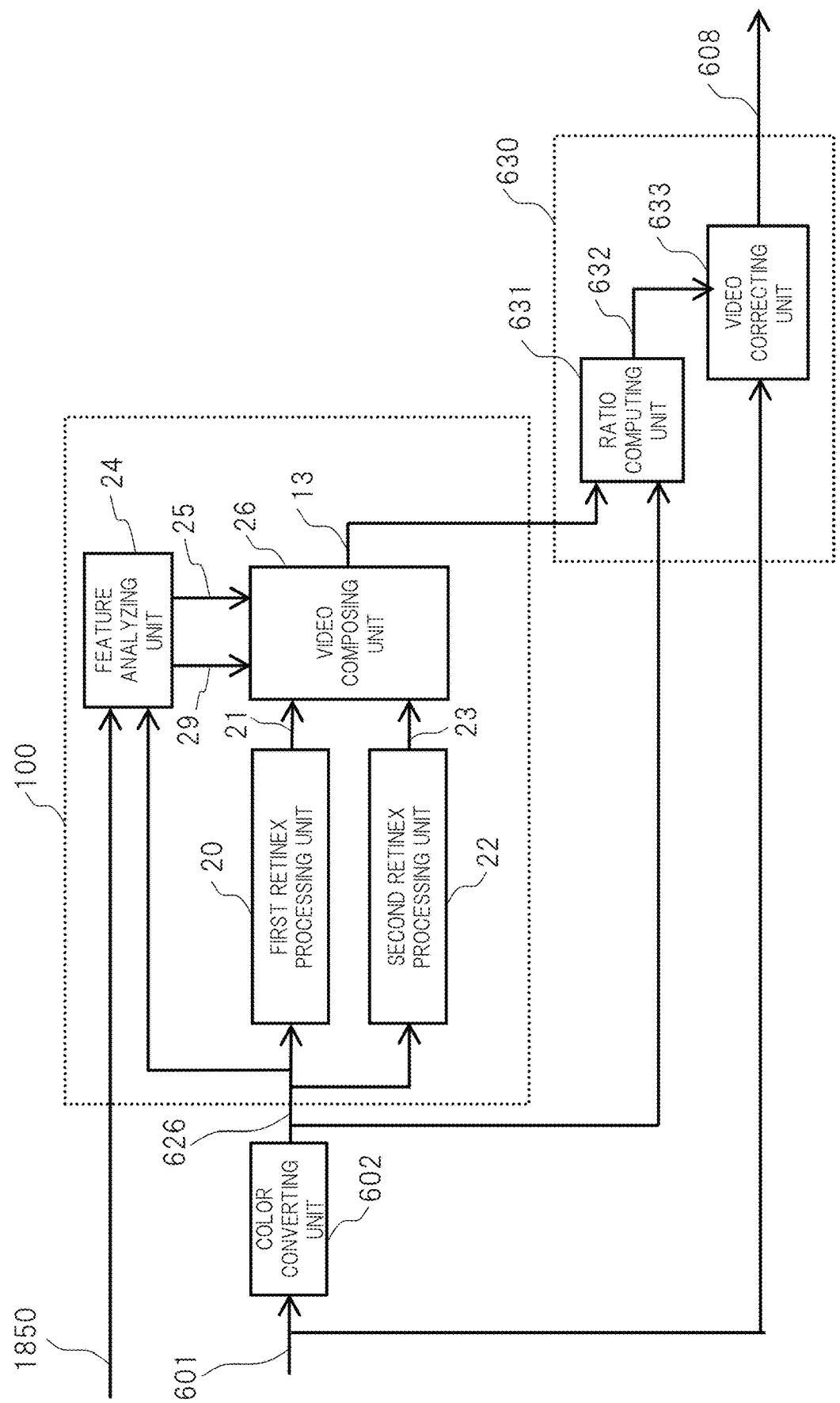
FIG. 20 is an example of a configuration of a video correcting unit.

In addition, as another example of the configuration of the video correcting unit 1810, a configuration illustrated in FIG. 20 in which the configuration illustrated in FIG. 17 according to the fourth embodiment may be improved, for example. Unlike the video correcting unit illustrated in FIG. 17, a video correcting unit illustrated in FIG. 20 is configured so as to be capable of obtaining the APL information 1850 from the input signal processing unit 1800. The feature analyzing unit 24 for the APL information 1850 can perform processing using the APL information 1850 obtained from the input signal processing unit 1800. The feature analyzing unit 24 controls a video composing control signal 25 using the APL information 1850, and controls the magnitude of a gain control value $\beta$ used by a gain control unit 31. As describe in each of the embodiments described above, by controlling the gain control value $\beta$, it is possible to control visibility improving process intensity.

Therefore, the video correcting unit 1810 according to the present embodiment can change the gain control value $\beta$ based on the APL information 1850 to control the visibility improving process intensity. A detailed control method will be described later.

Figure 21:
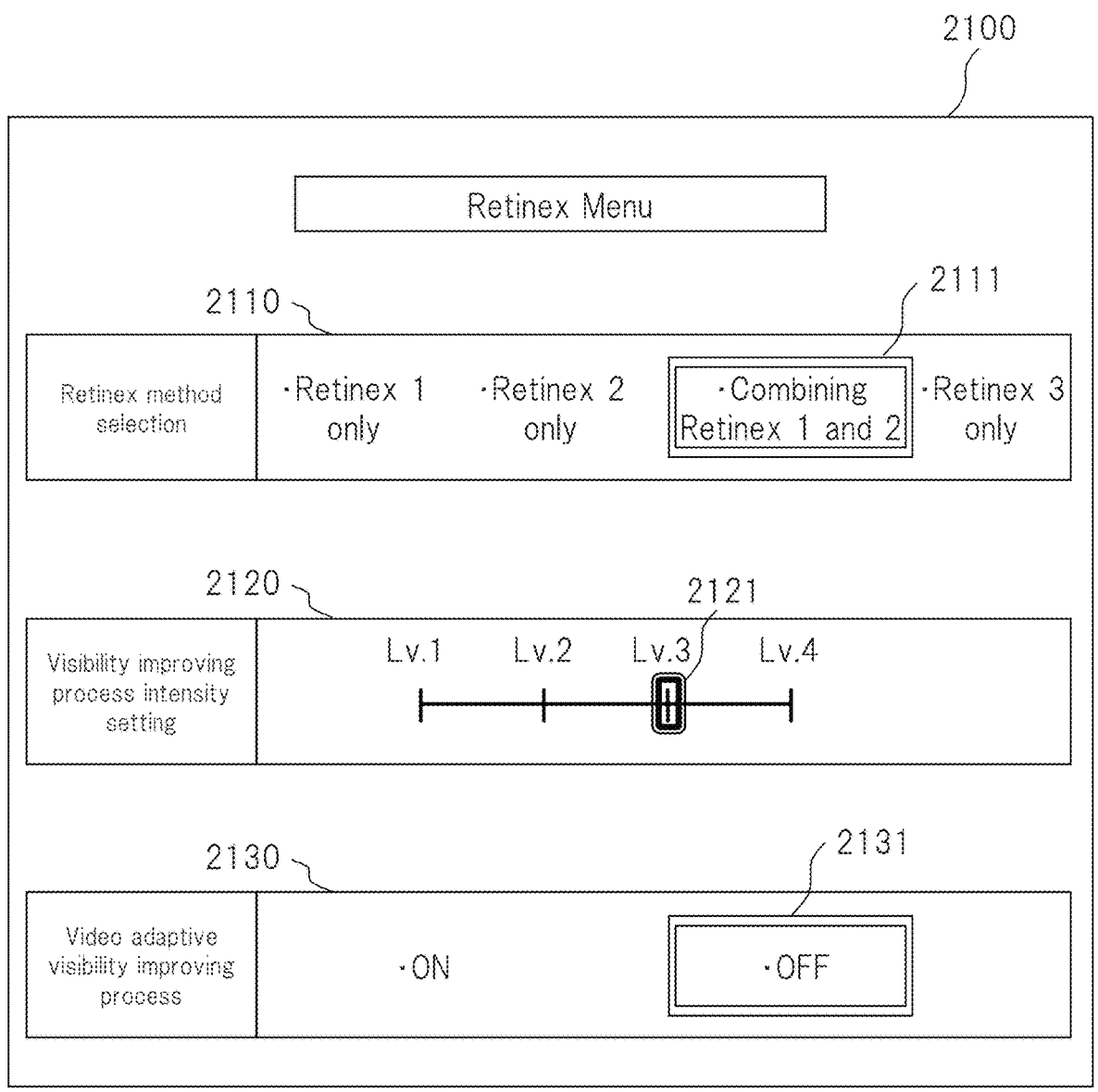
FIG. 21 is an example of a setting menu screen according to a fifth embodiment of the present invention.

Next, the setting menu screen described above will be described with reference to FIG. 21. FIG. 21 is a diagram illustrating a setting menu screen 2100 that is an example of the setting menu screen displayed by the video display device according to the present embodiment.

The setting menu screen 2100 is generated by a menu screen signal generating unit (whose illustration is omitted) in the video display device, and is outputted instead of a correction video signal 13, an output video signal 606, or an output video signal 608. Alternatively, the setting menu screen 2100 may be superimposed on these video signals and outputted.

An item "Retinex method selection" 2110 in an example of the setting menu screen 2100 will be described. The item "Retinex method selection" 2110 allows to select whether to use the Retinex processing of both of a first Retinex processing unit 20 and a second Retinex processing unit 22 described in each embodiment. A selection thereof is configured so as to be performed by moving a cursor 2111 in accordance with the operation signal 1821 generated based on an operation of an operation button of a remote controller or a device body. A selection item and a process in this case will be described.

For example, in a case where a selection item "Retinex 1 only" is selected, only a process of the first Retinex processing unit 20 is applied to a process of the video correcting unit, and a process of the second Retinex processing unit 22 is not applied to the process of the video correcting unit. Specifically, a composition control value α may be set to 1, or the operation of the second Retinex processing unit 22 may be turned OFF.

Next, on the contrary, in a case where a selection item "Retinex 2 only" is selected, only the process of the second Retinex processing unit 22 is applied to the process of the video correcting unit, and the process of the first Retinex processing unit 20 is not applied to the video correcting unit. Specifically, the composition control value α may be set to 0, and the operation of the first Retinex processing unit 20 may be turned OFF. In a case where a selection item "Combining Retinex 1 and 2" is selected, the processes of the first Retinex processing unit 20 and the process of the second Retinex processing unit 22 are composed and outputted as described above in the embodiments.

In a case where a selection item "Retinex OFF" is selected, both of the process of the first Retinex processing unit 20 and the process of the second Retinex processing unit 22 are not applied to the process of the video correcting unit. The operations of both processes may be turned OFF, or the video inputted into the video correcting unit may be outputted while bypassing the video correcting unit.

In the item "Retinex method selection" 2110 described above, it is not always required to present the four selection items described above to the user. For example, only two of the selection item "Combining Retinex 1 and 2" and the selection item "Retinex OFF" may be presented. Alternatively, three of the selection item "Combining Retinex 1 and 2", the selection item "Retinex 1 only", and the selection item "Retinex OFF" may be presented. That is, at least two items among the exemplified items may be presented.

Next, an item "visibility improving process intensity setting" 2120 of an example of the setting menu screen 2100 will be described. By using the item, a magnitude of the effect of the process of the gain control unit 31 of FIG. 3 can be set. Specifically, a magnitude of the amplitude of a change amount of the gain control value β is changed in accordance with the movement of a slide bar 2121. In the example of this drawing, the slide bar 2121 can set any of four stages of levels including Level 1, Level 2, Level 3, and Level 4 by selection of the user. It is set so that the amplitude of a change in the gain control value β becomes larger as the level increases to Level 1, Level 2, Level 3, and Level 4. Detailed setting will be described later. Here, in all the properties of FIGS. 5B, 5D, and 5F, the visibility improving process is enhanced more as the amplitude of the change amount of the gain control value β is larger.

Next, an item "video adaptive visibility improving process" 2130, which is an example of the setting menu screen 2100, will be described. This is an item for selecting whether the video correcting unit 1810 turns ON or OFF a function of changing the gain control value β by using the APL information 1850 obtained by the input signal processing unit 1800 according to the present embodiment.

In the item "video adaptive visibility improving process" 2130, the user can move a cursor 2131 via an operation of the operation button of the remote controller or a device body to select any of "ON" and "OFF". In a case where "OFF" is selected, the video correcting unit 1810 can control the magnitude of the gain control value β described above by user selection of the item "visibility improving process intensity setting" 2120 described above. However, it does not change in conjunction with a value of an APL indicated by the APL information 1850. In a case where "ON" is selected, the video correcting unit 1810 changes the gain control value β described above in conjunction with the value of the APL indicated by the APL information 1850.

In addition, it is possible to differentiate a control of the gain control value β in conjunction with the APL information 1850 for each user selection of the item "visibility improving process intensity setting" 2120 described above. A specific control example will be described later.

As explained above, by using the setting menu screen 2100 illustrated in FIG. 21, the user can adjust the video correcting process in accordance with a user's preference, a usage purpose, or a usage environment of the video display device. This makes it possible to provide a more convenient video display device.

Next, an example of a relationship of setting of a user selection status for the item "visibility improving process intensity setting" 2120 and a user selection status for the item "video adaptive visibility improving process" 2130 in the setting menu screen 2100 illustrated in FIG. 21, an APL of an input video stored in the APL information 1850, and the gain control value β, which is a gain that emphasizes visibility improvement will be described with reference to FIG. 22 to FIG. 25.

FIG. 22 illustrates an example of a setting control of the gain control value β, which is a luminance visibility improvement gain, in a state where "OFF" of the "video adaptive visibility improving process" 2130 is selected in the item "video adaptive visibility improving process" of the setting menu screen 2100 illustrated in FIG. 21.

In rows arranged vertically in a table of FIG. 22, the user selection status for the item "visibility improving process intensity setting" 2120 is illustrated for Level 1 (Lv.1), Level 2 (Lv.2), Level 3 (Lv. 3), and Level 4 (Lv.4). Note that in each drawing from FIG. 22 to FIG. 30, in case of being simply referred to as Lv.1, Lv.2, Lv.3, or Lv.4, it indicates a level selected by the user in the item "visibility improving process intensity setting" 2120.

In addition, the notation (ON) after the notation of the Lv.1, Lv.2, Lv.3, or Lv.4 indicates that a selection status for a "video adaptive visibility improving process" is "ON" in the item "video adaptive visibility improving process" 2130 of the setting menu screen 2100 illustrated in FIG. 21. Similarly, the notation (OFF) after the notation of the Lv.1, Lv.2, Lv.3, or Lv.4 indicates that the selection status for the "video adaptive visibility improving process" is "OFF" in the item "video adaptive visibility improving process" 2130 of the setting menu screen 2100 illustrated in FIG. 21. The same applies to the drawings after this drawing.

In addition, in columns arranged side by side in the table of FIG. 22, a value of an APL indicated by the APL information 1850 is illustrated in percentage notation.

Here, in FIG. 22, in order to more generalize and explain the feature of the control of a luminance visibility improvement gain $\beta$, the maximum gain is set to 100, the minimum gain is set to 0, and they are normalized and notated in the table. For example, the actual magnification of the minimum gain that is normalized and takes a value of 0 may be set to 1.0. Since the actual magnification of the maximum gain depends upon design concept, it may be set to suitable magnification in the video display device. Values from 0 to 100 of the normalized values may be considered as linearly normalized values, or may be considered as values normalized using a logarithmic curve or the like.

In the example of FIG. 22, the luminance visibility improvement gain $\beta$ is set to become larger as the user selection status for the item "visibility improving process intensity setting" 2120 increases to Level 1, Level 2, Level 3, and Level 4. This makes it possible to select the effect of the luminance visibility improving process in accordance with the user's preference.

However, the selection status for the "video adaptive visibility improving process" is "OFF" in the item "video adaptive visibility improving process" 2130 of the setting menu screen 2100 illustrated in FIG. 21. Therefore, the luminance visibility improvement gain $\beta$ is fixed with respect to the value of the APL in each state in which the user selection status for the item "visibility improving process intensity setting" 2120 is Level 1, Level 2, Level 3, or Level 4.

For example, in the example of FIG. 22, the luminance visibility improvement gain $\beta$ is fixed to 0 (the minimum gain) when the user selection status is Level 1. The luminance visibility improvement gain $\beta$ is fixed to 13 when the user selection status is Level 2. The luminance visibility improvement gain $\beta$ is fixed to 57 when the user selection status is Level 3. The luminance visibility improvement gain $\beta$ is fixed to 100 (the maximum gain) when the user selection status is Level 4. That is, in the example of FIG. 22, the luminance visibility improvement gain $\beta$ does not change in conjunction with the value of the APL.

Next, FIG. 23 illustrates an example of a setting control of the luminance visibility improvement gain $\beta$ in a state where "ON" of the "video adaptive visibility improving process" 2130 is selected in the item "video adaptive visibility improving process" of the setting menu screen 2100 illustrated in FIG. 21. Since definition of each value in a table of FIG. 23 is similar to that in FIG. 22, description thereof will be omitted. In the example of FIG. 23, unlike that in FIG. 22, the luminance visibility improvement gain $\beta$ changes in conjunction with the value of the APL. In the example of FIG. 23, even in a state where the user selection status for the item "visibility improving process intensity setting" 2120 is any of Level 1, Level 2, Level 3, and Level 4, the luminance visibility improvement gain $\beta$ is set to increase from 0% to a predetermined value (for example, 30%) of the APL.

In addition, when the APL exceeds the predetermined value (for example, 30%) even in a state where the user selection status is any of Level 1, Level 2, Level 3, and Level 4, the luminance visibility improvement gain $\beta$ is set to be saturated. A value of the luminance visibility improvement gain $\beta$ at the time of the saturation is set so as to become larger in accordance with the level of the user selection status for the item "visibility improving process intensity setting" 2120.

That is, in the example of FIG. 23, the maximum effect of the luminance visibility improvement gain $\beta$ can be set in accordance with the user's preference, and in a scene where the APL is low, the luminance visibility improvement gain $\beta$ can be changed in conjunction with the APL. In the control example, the gain of the gain control unit 31 illustrated in FIG. 3 can be controlled for each pixel, and the luminance visibility improvement effect can be changed suitably. The similar effect to that in the control example cannot be obtained by contrast adjustment applied to the entire screen.

Figure 24:
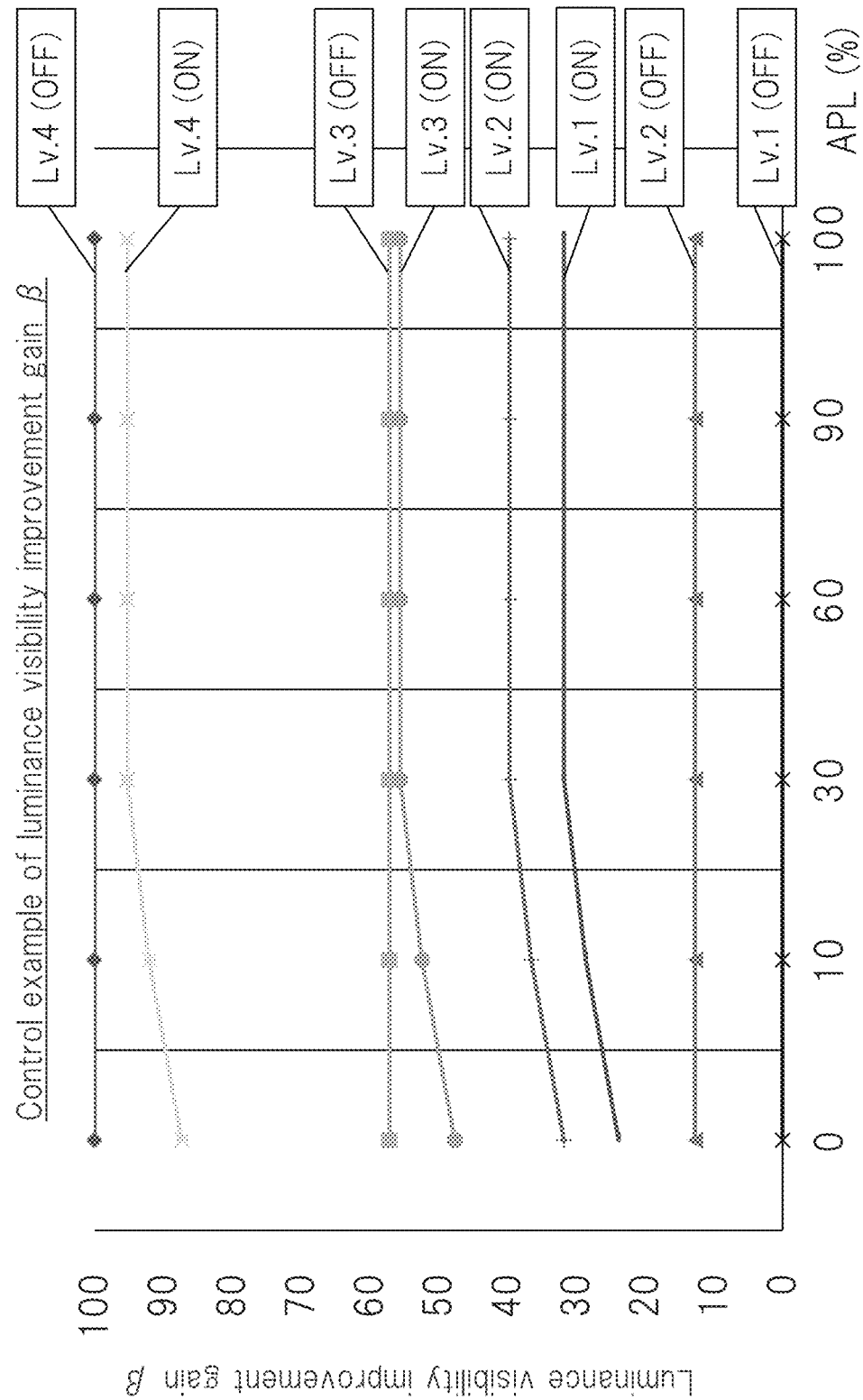
FIG. 24 is an example of a control of a luminance visibility improvement gain according to the fifth embodiment of the present invention.

Next, FIG. 24 illustrates as a graph both the control example of the luminance visibility improvement gain (illustrated in FIG. 22 and the control example of the luminance visibility improvement gain $\beta$ illustrated in FIG. 23. Since the features of the setting control of the luminance visibility improvement gain $\beta$ have already been described with reference to FIG. 22 and FIG. 23, the description thereof again will be omitted.

Figure 25:
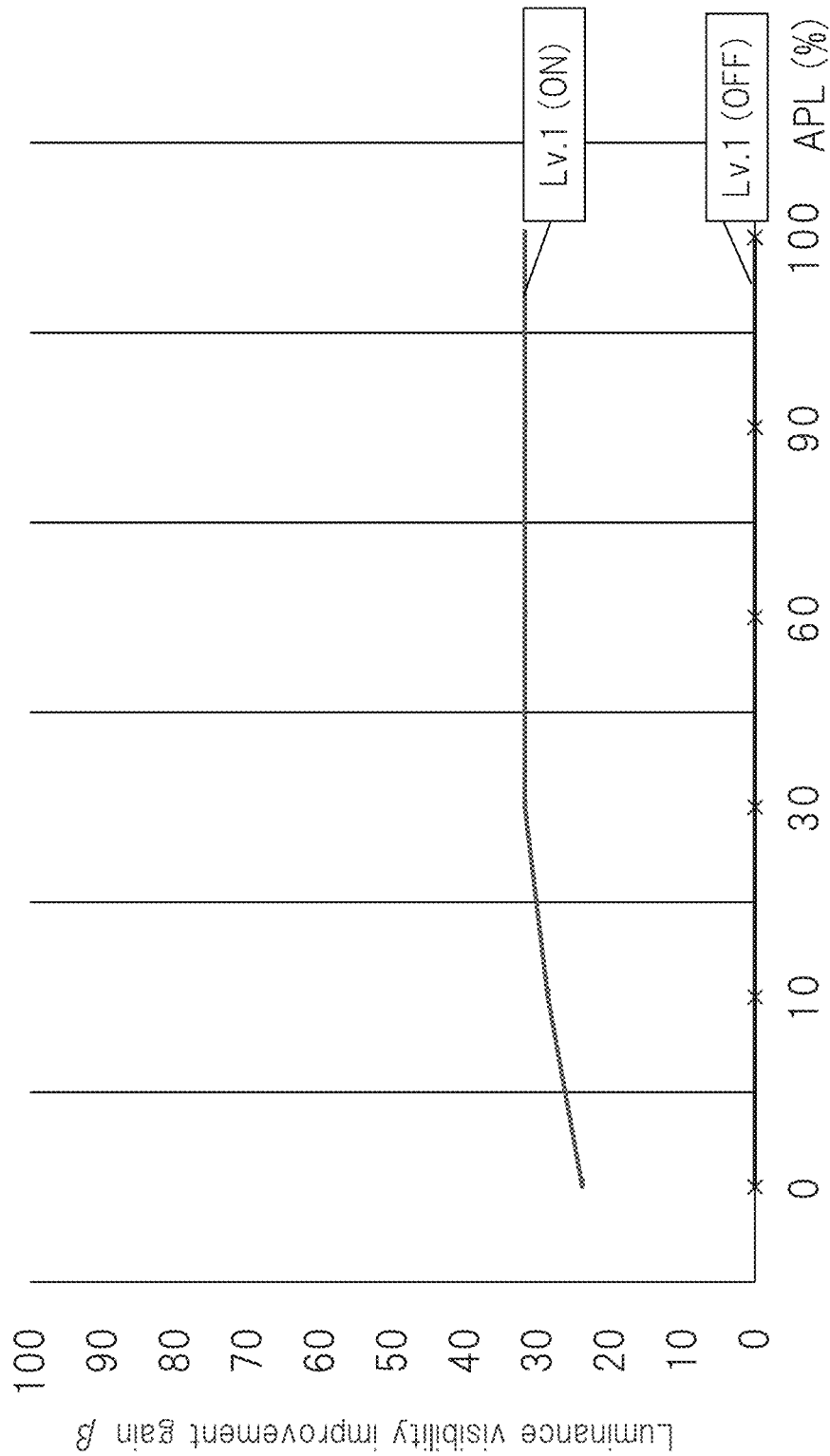
FIG. 25 is an explanatory drawing of an example of a control of a luminance visibility improvement gain according to the fifth embodiment of the present invention.

Next, among the setting controls of the luminance visibility improvement gain $\beta$ illustrated in FIG. 24, a more characteristic example will be described with reference to FIG. 25. FIG. 25 is a diagram in which a setting example of the luminance visibility improvement gain $\beta$ when the selection status for the "video adaptive visibility improving process" in the item "video adaptive visibility improving process" 2130 is "OFF" and the user selection status for the item "visibility improving process intensity setting" 2120 is Level 1 is compared with a setting example of the luminance visibility improvement gain $\beta$ when the selection status for the "video adaptive visibility improving process" in the item "video adaptive visibility improving process" 2130 is "ON" and the user selection status for the item "visibility improving process intensity setting" 2120 is Level 1. In the example of FIG. 25, even though the user selection status for the item "visibility improving process intensity setting" 2120 remains at Level 1 of the minimum selection level, the luminance visibility improvement gain $\beta$ is controlled so as to become larger in any APL when the selection status for the "video adaptive visibility improving process" in the item "video adaptive visibility improving process" 2130 is switched from "OFF" to "ON". This makes it possible for the user to confirm the effect of the "video adaptive visibility improving process" by visually observing a displayed video, which is preferable.

According to the video display device according to the fifth embodiment of the present invention, which has been described above, it becomes possible to dynamically control the visibility improving process by using the gain of the visibility improving process in which the Retinex processing performed for each pixel is used.

Sixth Embodiment

The present embodiment is an example in which in the video display device according to the fifth embodiment of the present invention, the color correction ratio described in the fourth embodiment is also dynamically controlled for an input video in a case where a visibility improving process is dynamically controlled for the input video by using a gain of the visibility improving process in which Retinex processing performed for each pixel is used.

Specifically, a function of dynamically controlling an input video by multiplying a color correction ratio by a gain is added to the video display device according to the fifth embodiment of the present invention.

A video display device according to a sixth embodiment of the present invention is an example improved based on the video display device according to the fifth embodiment. Therefore, a configuration example of the video display device according to the sixth embodiment will also be described with reference to FIG. 18, which illustrates the configuration example of the video display device according to the fifth embodiment. Hereinafter, of the configuration illustrated in FIG. 18, a portion that performs a process different from that of the fifth embodiment will be described, but the repetitive description for a portion that performs the common process to that of the fifth embodiment will be omitted.

In the video display device according to the sixth embodiment of the present invention, similarly to the video display device according to the fifth embodiment, a luminance visibility improvement gain β, which is a gain that emphasizes visibility improvement, is set based on a relationship among a user selection status for an item "visibility improving process intensity setting" 2120 and a user selection status for an item "video adaptive visibility improving process" 2130 in a setting menu screen 2100 illustrated in FIG. 21, and an APL of an input video stored in APL information 1850.

In addition to this, in the video display device according to the sixth embodiment of the present invention, a value of the gain to be multiplied by the color correction ratio described in the fourth embodiment is set based on the relationship among the user selection status for the item "visibility improving process intensity setting" 2120 and the user selection status for the item "video adaptive visibility improving process" 2130 in the setting menu screen 2100 illustrated in FIG. 21, and the APL of the input video stored in the APL information 1850. In the present embodiment, the gain is referred to as a "color correction ratio gain".

Here, a value of the color correction ratio described in the fourth embodiment is specifically a color correction ratio 622 illustrated in FIG. 15 or a color correction ratio 632 illustrated in FIG. 17. In the sixth embodiment, in a case where a configuration example illustrated in FIG. 19 is adopted as a configuration of a video correcting unit 1810, a value of the color correction ratio 622 described above is used for a gain setting control (gain setting control) of the color correction ratio, which will be described below. In the sixth embodiment, in a case where a configuration example illustrated in FIG. 20 is adopted as the configuration of the video correcting unit 1810, a value of the color correction ratio 632 described above is used for the gain setting control (gain setting control) of the color correction ratio, which will be described below.

These color correction ratio parameters are parameters for bringing color balance after Retinex processing closer to color balance before the Retinex processing. Specifically, as the intensity of the Retinex processing increases, the color balance tends to change in a direction in which saturation is lost. However, these color correction ratios allow the color balance to be corrected in a direction of increasing the saturation.

An example of a relationship among the user selection status for the item "visibility improving process intensity setting" 2120 and the user selection status for the item "video adaptive visibility improving process" 2130 in the setting menu screen 2100 illustrated in FIG. 21, the APL of the input video stored in the APL information 1850, and setting of a value of a color correction ratio gain will be described with reference to FIG. 26 to FIG. 30.

FIG. 26 illustrates an example of a setting control of a value of the color correction ratio gain in a state where "OFF" of a "video adaptive visibility improving process" is selected in the item "video adaptive visibility improving process" 2130 of the setting menu screen 2100 illustrated in FIG. 21.

In rows arranged vertically in a table of FIG. 26, similar to FIG. 22, the user selection status for the item "visibility improving process intensity setting" 2120 is illustrated for Level 1 (Lv.1), Level 2 (Lv.2), Level 3 (Lv.3), and Level 4 (Lv.4). In addition, in columns arranged side by side in the table of FIG. 22, similar to FIG. 22, a value of an APL indicated by the APL information 1850 is illustrated in percentage notation.

Here, in FIG. 26, in order to more generalize and explain the feature of the control of a value of the color correction ratio gain, the maximum color correction ratio gain is set to 100, the minimum color correction ratio gain is set to 0, and they are normalized and notated in the table. For example, the actual magnification of the maximum color correction ratio gain that is normalized and takes a value of 100 may be set to 1.0. For example, the actual magnification of the minimum color correction ratio gain that is normalized and takes a value of 0 may be set to 0, 0.5, or the like. Values from 0 to 100 of the normalized values may be considered as linearly normalized values, or may be considered as values normalized using a logarithmic curve or the like.

In the example of FIG. 26, the color correction ratio gain is set to become larger as the user selection status for the item "visibility improving process intensity setting" 2120 increases to Level 1, Level 2, Level 3, and Level 4. Here, the control of FIG. 26 according to the sixth embodiment is performed in addition to a control of the luminance visibility improvement gain β, which is a gain that emphasizes the visibility improvement illustrated in FIG. 22. Thus, in a case where an effect of a luminance visibility improving process is selected in accordance with a user's preference by controlling the luminance visibility improvement gain β illustrated in FIG. 22, it is possible to correct the color balance according to the effect of the luminance visibility improving process by controlling the color correction ratio gain illustrated in FIG. 26.

However, the selection status for the "video adaptive visibility improving process" is "OFF" in the item "video adaptive visibility improving process" 2130 of the setting menu screen 2100 illustrated in FIG. 21. Therefore, the color correction ratio gain is fixed with respect to the value of the APL in each state in which the user selection status for the item "visibility improving process intensity setting" 2120 is Level 1, Level 2, Level 3, or Level 4.

For example, in the example of FIG. 26, the color correction ratio gain is fixed to 0 (the minimum color correction ratio) when the user selection status is Level 1. The color correction ratio gain is fixed to 38 when the user selection status is Level 2. The color correction ratio gain is fixed to 69 when the user selection status is Level 3. The color correction ratio gain is fixed to 100 (the maximum color correction ratio gain) when the user selection status is Level 4. That is, in the example of FIG. 26, the color correction ratio gain does not change in conjunction with the value of the APL.

Next, FIG. 27 illustrates an example of a setting control of the color correction ratio gain in a state where "ON" of the "video adaptive visibility improving process" 2130 is selected in the item "video adaptive visibility improving process" of the setting menu screen 2100 illustrated in FIG. 21. Since definition of each value in a table of FIG. 27 is similar to that in FIG. 26, description thereof will be omitted. In the example of FIG. 27, unlike that in FIG. 26, the color correction ratio gain changes in conjunction with the value of the APL. In the example of FIG. 27, even in a state where the user selection status for the item "visibility improving process intensity setting" 2120 is any of Level 1, Level 2, Level 3, and Level 4, the color correction ratio gain is set to increase from 0% to a predetermined value (for example, 60%) of the APL.

In addition, when the APL exceeds the predetermined value (for example, 60%) even in a state where the user selection status is any of Level 1, Level 2, Level 3, and Level 4, the color correction ratio gain is set to be saturated. In FIG. 27, a value of the color correction ratio gain at the time of the saturation is set so as not to change in accordance with the level of the user selection status for the item "visibility improving process intensity setting" 2120 and become common. A reason to set in this manner and an effect thereof will be described later.

Here, the control illustrated in FIG. 27 according to the sixth embodiment is performed in addition to the control of the luminance visibility improvement gain β, which is a gain that emphasizes the visibility improvement illustrated in FIG. 23. Thus, in a case where the effect of the luminance visibility improving process can change in conjunction with the APL by the control of the luminance visibility improvement gain β illustrated in FIG. 23, it is possible to suitably correct the color balance for the effect of the luminance visibility improving process, which can change in conjunction with the APL by the control of the color correction ratio gain illustrated in FIG. 27.

That is, in a control example illustrated in FIG. 27, by multiplying the color correction ratio 622 or the color correction ratio 632 by the color correction ratio gain, it is possible to control the color correction of the output video generating unit 605 illustrated in FIG. 19 or the video correcting unit 633 illustrated in FIG. 20 on a pixel-by-pixel basis. This makes it possible to change the color correction effect suitably. The similar effect to that in the control example cannot be obtained by color correction adjustment applied to the entire screen.

Figure 28:
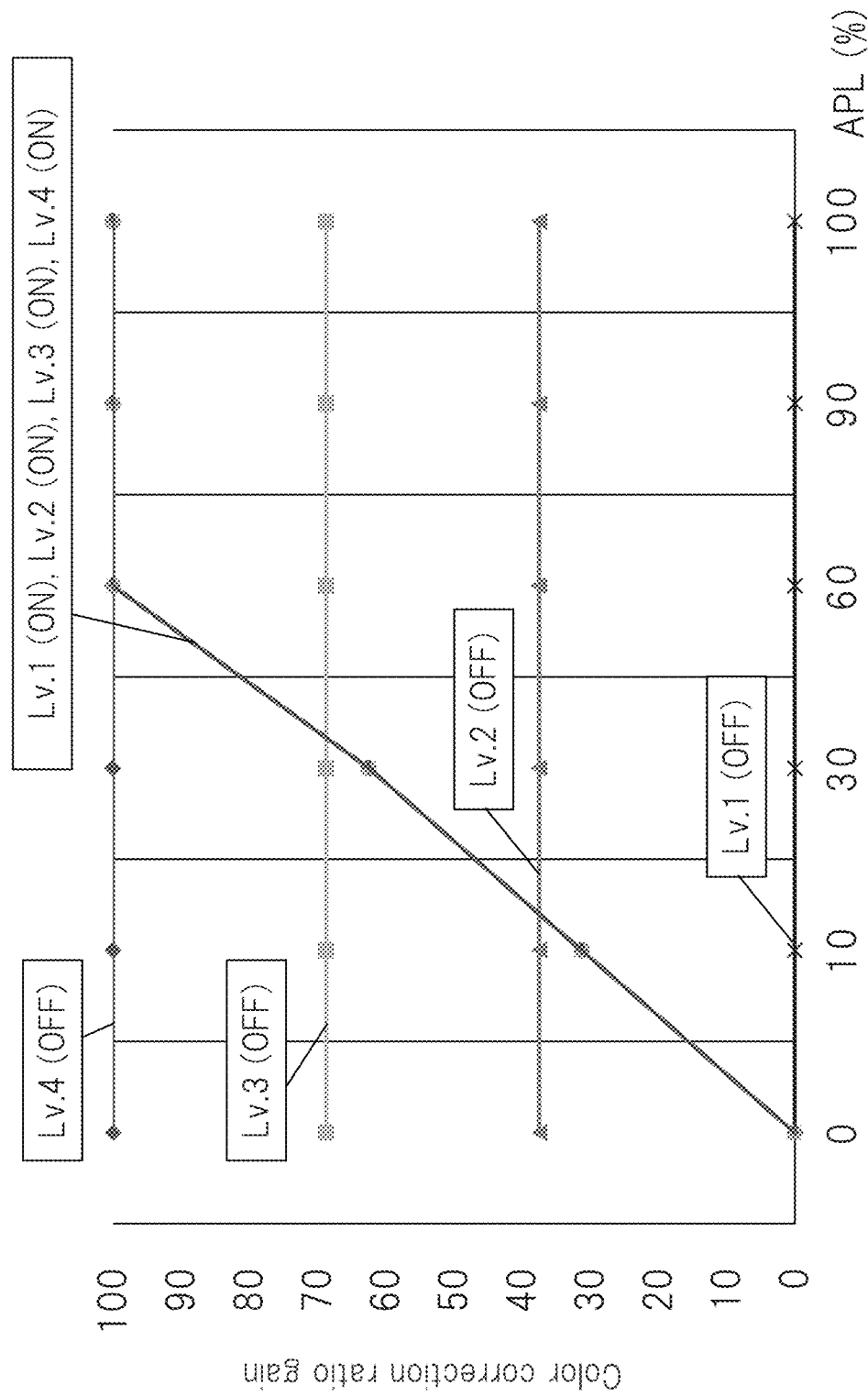
FIG. 28 is an example of a control of a color correction ratio gain according to the sixth embodiment of the present invention.

Next, FIG. 28 illustrates as a graph both a control example of the color correction ratio gain illustrated in FIG. 26 and a control example of the color correction ratio gain illustrated in FIG. 27. Since the features of the setting control of the color correction ratio gain have already been described with reference to FIG. 26 and FIG. 27, the description thereof again will be omitted.

Next, an effect by the setting control of the color correction ratio gain illustrated in FIG. 28 will be described with respect to FIG. 29. FIG. 29 is a drawing in which a group of arrows 2910 for supplementary explanation and a group of arrows 2920 for supplementary explanation are added to FIG. 28.

First, a setting control of a color correction ratio gain for a video having a relatively high APL (hereinafter, referred to as a "high APL video") will be described. In the setting control of the color correction ratio gain illustrated in FIG. 29, in a case where the user selection status for the item "visibility improving process intensity setting" 2120 is Level 1, Level 2, or Level 3 (that is, in a case where the visibility improving process intensity is any one other than Level 4 of the maximum), in the high APL video, the color correction ratio gain of the group of arrows 2910 rises when the selection status for the "video adaptive visibility improving process" changes from "OFF" to "ON".

In the example of FIG. 29, when the APL is 60% or higher, the color correction ratio gain rises to the maximum color correction ratio gain in any level of Level 1, Level 2, and Level 3. The maximum color correction ratio gain is the same value as that when the user selection status for the item "visibility improving process intensity setting" 2120 is Level 4 in a state where the selection status for the "video adaptive visibility improving process" is "OFF". The reason for controlling in this manner is as follows.

That is, as described above, in the first place, the color correction ratio is for color correction to correct the saturation that is lost when the intensity of the Retinex processing is increased. Therefore, it is better to set the color correction ratio gain as large as possible in a state where the intensity of the Retinex processing becomes stronger. On the other hand, if a color correction ratio gain is increased in a video having a relatively low APL (hereinafter, referred to as a "low APL video") under a condition that the intensity of Retinex processing is not strong, there was a possibility that demerit occurs. The demerit may include a situation that the saturation becomes larger than necessary, a situation that color noise occurs in a black video, and a situation that chromatic colors unnecessary in a gray video are emphasized.

Therefore, in a case where the selection status for the "video adaptive visibility improving process" is "OFF", it was necessary to set the color correction ratio gain to an intermediate value instead of the maximum color correction ratio gain in order to obtain the color correction effect for the effect of the visibility improving process corresponding to the level selected by the user for the item "visibility improving process intensity setting" 2120 in the high APL video while minimizing the demerit of increasing the color correction ratio gain in the low APL video. This has been a problem that the merit of color correction using the color correction ratio gain cannot be obtained to the maximum in a case where there is no "video adaptive visibility improving process".

On the other hand, in a control example illustrated in FIG. 29 according to the present embodiment, in a case where the selection status of the "video adaptive visibility improving process" is "ON", the color correction ratio gain can be changed in accordance with the APL. Therefore, the problem can be solved, and it becomes possible to use the maximum color correction ratio gain for the item "visibility improving process intensity setting" 2120 in the high APL video regardless of the level selected by the user. this makes it possible to obtain the merit of color correction using the color correction ratio gain to the maximum.

Next, a setting control of the color correction ratio gain for the low APL video will be described. In the setting control of the color correction ratio gain illustrated in FIG. 29, in a case where the user selection status for the item "visibility improving process intensity setting" 2120 is Level 2, Level 3, or Level 4, the color correction ratio gain decreases as shown by the group of arrows 2920 in the low APL video when the selection status of the "video adaptive visibility improving process" is changed from "OFF" to "ON". In particular, the decrease becomes the maximum in a case where Level 4 having the maximum visibility improving process intensity is selected. In the example of FIG. 29, when the APL is lower than 60%, the color correction ratio gain becomes lower than the "OFF" state at any level of Level 2, Level 3, and Level 4. In the example of FIG. 29, the color correction ratio gain decreases to the minimum color correction ratio gain when the APL is 0% at any level. The maximum color correction ratio gain is the same value as that in a case where the user selection status for the item "visibility improving process intensity setting" 2120 is Level 1 in a state where the selection status for the "video adaptive visibility improving process" is "OFF". The reason for controlling in this manner is as follows.

That is, when the control illustrated in FIG. 29 is performed, the control of the luminance visibility improvement gain β illustrated in FIG. 23 is also performed. Thus, for the low APL video, the intensity of the Retinex processing in the luminance visibility improving process by controlling the luminance visibility improvement gain β becomes low. Therefore, it is not necessary to maintain a high color correction ratio gain for the low APL video.

In addition, as described above, if the color correction ratio gain is increased in the low APL video under a condition that the intensity of the Retinex processing is not strong, there is a possibility that demerit occurs. The demerit may include a situation that the saturation becomes larger than necessary, a situation that color noise occurs in a black video, and a situation that chromatic colors unnecessary in a gray video are emphasized. Therefore, for the low APL video, it is preferable to set the color correction ratio gain to be low to the extent that no demerit occur. For the two reasons described above, as illustrated in FIG. 29, it can be said that a control of gradually reducing the color correction ratio gain in accordance with the APL is more suitable for the low APL video.

In the example of FIG. 29, for the reasons described above, in a case where the user selection status for the item "visibility improving process intensity setting" 2120 is any of Level 1, Level 2, Level 3, and Level 4, the control of gradually reducing the color correction ratio gain in accordance with the APL is performed for the low APL video while maximizing the merit of the maximum color correction ratio gain in the high APL video. In this case, in particular, it is not necessary to make a difference depending upon the level selected by the user for the item "visibility improving process intensity setting" 2120. Thus, in the example of FIG. 29, in a case where the selection status for the "video adaptive visibility improving process" is "ON", the control of the color correction ratio gain is common regardless of the level selected by the user.

However, in a case where it is necessary to differentiate the control of the color correction ratio gain depending upon the level selected by the user in a state where the selection status of the "video adaptive visibility improving process" is "ON", it is not always necessary to control the color correction ratio gain in common. In this case, it is possible to obtain the effects of the present invention so long as the tendency of increase or decrease of the color correction ratio gain with respect to the APL described with reference to FIG. 29 is maintained.

Next, comparison of a setting control example of the luminance visibility improvement gain β and a setting control example of the color correction ratio gain when the selection status of the "video adaptive visibility improving process" according to the present embodiment is "ON" will be described with reference to FIG. 30.

An upper half of FIG. 30 illustrates a graph illustrating a setting control example in which the selection status for the "video adaptive visibility improving process" is "ON" among the setting control examples of the luminance visibility improvement gain β illustrated in FIG. 24. A lower half of FIG. 30 illustrates a graph illustrating a setting control example in which the selection status for the "video adaptive visibility improving process" is "ON" among the setting control examples of the color correction ratio gain illustrated in FIG. 28. As illustrated in FIG. 30, in the video display device according to the present embodiment, the luminance visibility improvement gain β increases from 0% of the APL to about 30% of the APL, and is saturated at about 30% of the APL. On the other hand, the color correction ratio gain increases from 0% of the APL to about 60% of the APL, and is saturated at about 60% of the APL.

Thus, in the video display device according to the present embodiment, in a case where both the luminance visibility improvement gain β and the color correction ratio gain increase, the value of the APL at which the increase in the color correction ratio gain is saturated is made larger than the value of the APL at which the increase in the luminance visibility improvement gain β is saturated. As a result, the increase in the color correction ratio gain becomes slower than the increase in the luminance visibility improvement gain β.

As described above, it has been described that if the color correction ratio gain becomes larger than necessary for the luminance visibility improvement effect in the low APL, there is a possibility that demerit, such as a situation that the saturation becomes larger than necessary, a situation that color noise occurs in a black video, and a situation that chromatic colors unnecessary in a gray video are emphasized, occurs. Here, if the increase in the color correction ratio gain with respect to the APL is controlled so as to be slower than the increase in the luminance visibility improvement gain β with respect to the APL as in the control of the video display device according to the present embodiment illustrated in FIG. 30, it is possible to prevent the color correction ratio gain from becoming larger than necessary for the luminance visibility improvement effect in the low APL. This makes it possible to reduce the demerit described above.

In addition, as can be seen from FIG. 30, in a case where the selection status for the video adaptive visibility improving process is "ON", the luminance visibility improvement gain β is saturated at about 30% of the APL. The value of the luminance visibility improvement gain β at the time of the saturation is set so as to be different depending upon the level of the user selection status for the item "visibility improving process intensity setting" 2120. On the other hand, the color correction ratio gain is saturated at about 60% of the APL, and the value of the color correction ratio gain at the time of the saturation is set so as to become the same regardless of the level of the user selection status for the item "visibility improving process intensity setting" 2120. By making such a relationship, it is possible to adjust the visibility improving process effect in accordance with the user's preference, and it becomes possible to use a color balance correction effect by color correction to the maximum.

According to the video display device according to the sixth embodiment of the present invention described above, it is possible to dynamically control the visibility improving process by using the gain of the visibility improving process in which the Retinex processing performed for each pixel is used. Moreover, it is possible to perform color correction more suitably for the dynamic visibility improving process.

REFERENCE SIGNS LIST

10 video input signal
12 internal video signal 13 correction video signal
15 display control signal
20 first Retinex processing unit
21 first correction video signal
22 second Retinex processing unit
23 second correction video signal
24 feature analyzing unit
25 video composing control signal
26 video composing unit
27, 28, 31 gain control unit
29 video composing control signal
30 adder
32 illuminance level signal
33 correction video signal of adaptive control
100 video correcting unit
101 reflected light component based on scale 1
102 reflected light component based on scale 2
120 reflected light detecting unit based on MSR
122 result of convolution product based on scale 1 filter
124 result of convolution product based on scale 2 filter
126 result value of SSR based on scale 1
128 result value of SSR based on scale 2
130 reflected light control unit based on MSR
131 result value of weighted averaging of result of each SSR (including gain)
152 result of convolution product based on specular filter
154 result of convolution product based on diffusing filter
156 result of convolution product based on ambient filter
158 result of function conversion of specular filter
160 result of function conversion of diffusing filter
162 result of function conversion of ambient filter
181 result value of weighted averaging of specular component and diffusing component (including gain)
302 edge signal
601 internal video signal
602, 603 color converting unit
604 correction video signal
605, 607, 630 output video generating unit
606, 608 output video signal
610, 611 absolute value obtaining unit
612, 631 ratio computing unit
613, 615, 633 video correcting unit
1000, 3000 video correcting unit

The invention claimed is:

1. A video display device comprising:
a video input unit;
a first Retinex processing unit configured to perform a first Retinex process on a video inputted from the video input unit;
a second Retinex processing unit configured to perform a second Retinex process, which is different from the first Retinex process, on the video inputted from the video input unit;
a video composing unit configured to compose a video processed by the first Retinex processing unit and a video processed by the second Retinex processing unit in accordance with a feature of the video inputted from the video input unit; and
a display unit configured to display a video based on the video outputted from the video composing unit,
wherein in a process of composing the video processed by the first Retinex processing unit and the video processed by the second Retinex processing unit, the video composing unit is configured to perform a luminance level converting process of converting a luminance level for each pixel so that more output luminance levels are assigned to a luminance band having a luminance distribution larger than a flat reference luminance distribution, to improve visibility of a video, and
wherein the video composing unit is configured to change a gain of the luminance level converting process in accordance with an average pixel value level of the video inputted from the video input unit.

2. The video display device according to claim 1,
wherein the gain of the luminance level converting process increases as the average pixel value level of the video inputted from the video input unit rises from 0%, and the gain can be changed so as to be saturated at a predetermined gain when the average pixel value level of the video inputted from the video input unit exceeds a predetermined value.

3. The video display device according to claim 2, further comprising:
an operation input unit configured to receive an operation input from a user,
wherein the predetermined gain at which the gain of the luminance level converting process is saturated can be changed based on an operation input of the user via the operation input unit.

4. The video display device according to claim 1, further comprising:
an operation input unit configured to receive an operation input from a user,
wherein a setting menu screen by which the user can change setting by an operation input via the operation input unit can be displayed on the display unit, and
wherein on the setting menu screen,
the gain of the luminance level converting process can be selected from a plurality of stages, and
the gain of the luminance level converting process can be selected so as to be set to any of a first state in which the gain is not changed in accordance with the average pixel value level of the video inputted from the video input unit and a second state in which the gain of the luminance level converting process can be changed in accordance with the average pixel value level of the video inputted from the video input unit.

5. The video display device according to claim 4,
wherein, in a case where a stage for minimizing the gain of the luminance level converting process is selected from the plurality of stages for the gain of the luminance level converting process by means of the setting menu screen and selection is changed from the first state to the second state, a value after the gain of the luminance level converting process is changed increases larger than a value before the change even though the average pixel value level of the video inputted from the video input unit is any value.

6. A video display device comprising:
a video input unit;
a first Retinex processing unit configured to perform a first Retinex process on a video inputted from the video input unit;
a second Retinex processing unit configured to perform a second Retinex process, which is different from the first Retinex process, on the video inputted from the video input unit;
a video composing unit configured to compose a video processed by the first Retinex processing unit and a video processed by the second Retinex processing unit in accordance with a feature of the video inputted from the video input unit;

a video generating unit configured to generate a video by correcting a vector on a color space in a same direction as a vector on a color space included by the video inputted from the video input unit by using a color correction ratio calculated based on an absolute value of a color space vector in a signal of the video composed by the video composing unit; and a display unit configured to display a video based on the video outputted from the video generating unit, wherein in a process of composing the video processed by the first Retinex processing unit and the video processed by the second Retinex processing unit, the video composing unit is configured to perform a luminance level converting process of converting a luminance level for each pixel so that more output luminance levels are assigned to a luminance band having a luminance distribution larger than a flat reference luminance distribution to improve visibility of a video, wherein the video composing unit is configured to change a gain of the luminance level converting process in accordance with an average pixel value level of the video inputted from the video input unit, wherein the video generating unit is configured to multiply the color correction ratio by a gain for the color correction ratio which is different from the gain of the luminance level converting process, and wherein the video generating unit is configured to change the gain for the color correction ratio to be multiplied by the color correction ratio in accordance with the average pixel value level of the video inputted from the video input unit.

7. The video display device according to claim 6, wherein the gain of the luminance level converting process increases as the average pixel value level of the video inputted from the video input unit rises from 0%, and the gain can be changed so as to be saturated at a predetermined gain when the average pixel value level of the video inputted from the video input unit exceeds a predetermined value.

8. The video display device according to claim 7, further comprising:

an operation input unit configured to receive an operation input from a user, wherein the predetermined gain at which the gain of the luminance level converting process is saturated can be changed based on an operation input of the user via the operation input unit.

9. The video display device according to claim 6, wherein the gain for the color correction ratio increases as the average pixel value level of the video inputted from the video input unit rises from 0%, and the gain can be changed so as to be saturated at predetermined gain when the average pixel value level of the video inputted from the video input unit exceeds a predetermined value.

10. The video display device according to claim 6, further comprising:

an operation input unit configured to receive an operation input from a user, wherein a setting menu screen by which the user can change setting by an operation input via the operation input unit can be displayed on the display unit, and wherein on the setting menu screen, the gain of the luminance level converting process can be selected from a plurality of stages, and the gain of the luminance level converting process can be selected so as to be set to any of a first state in which the gain is not changed in accordance with the average pixel value level of the video inputted from the video input unit and a second state in which the gain of the luminance level converting process can be changed in accordance with the average pixel value level of the video inputted from the video input unit.

11. The video display device according to claim 10, wherein the gain for the color correction ratio increases as the average pixel value level of the video inputted from the video input unit rises from 0%, and the gain can be changed so as to be saturated at a predetermined gain when the average pixel value level of the video inputted from the video input unit exceeds a predetermined value.

12. The video display device according to claim 11, wherein, in a case where a stage other than a stage for maximizing the gain of the luminance level converting process is selected from the plurality of stages for the gain of the luminance level converting process by means of the setting menu screen, the average pixel value level of the video inputted from the video input unit exceeds the predetermined value, and selection is changed from the first state to the second state, then a value after the gain for the color correction ratio is changed increases larger than a value before the change.

13. The video display device according to claim 11, wherein, in a case where the stage for maximizing the gain of the luminance level converting process is selected from the plurality of stages for the gain of the luminance level converting process by means of the setting menu screen, the average pixel value level of the video inputted from the video input unit is smaller than the predetermined value, and selection is changed from the first state to the second state, then a value after the gain for the color correction ratio is changed decreases smaller than a value before the change.

14. The video display device according to claim 6, wherein the gain of the luminance level converting process increases as the average pixel value level of the video inputted from the video input unit rises from 0%, and the gain can be changed so as to be saturated at a first gain when the average pixel value level of the video inputted from the video input unit exceeds a first value, wherein the gain for the color correction ratio increases as the average pixel value level of the video inputted from the video input unit rises from 0%, and the gain can be changed so as to be saturated at a second gain when the average pixel value level of the video inputted from the video input unit exceeds a second value, and wherein the second value of the average pixel value level is a value higher than the first value.

15. The video display device according to claim 14, further comprising:

an operation input unit configured to receive an operation input from a user, wherein the first gain, at which the gain of the luminance level converting process is saturated, can be changed based on an operation input of the user via the operation input unit, and wherein the second gain at which the gain for the color correction ratio is saturated does not change even in a case where the first gain, at which the gain of the luminance level converting process is saturated, is changed based on an operation input of the user via the operation input unit.

16. A projector comprising:
a video input unit;
a first Retinex processing unit configured to perform a first Retinex process on a video inputted from the video input unit;
a second Retinex processing unit configured to perform a second Retinex process, which is different from the first Retinex process, on the video inputted from the video input unit;
a video composing unit configured to compose a video processed by the first Retinex processing unit and a video processed by the second Retinex processing unit in accordance with a feature of the video inputted from the video input unit; and
a video projecting unit configured to project a display video based on the video outputted from the video composing unit,
wherein in a process of composing the video processed by the first Retinex processing unit and the video processed by the second Retinex processing unit, the video composing unit is configured to perform a luminance level converting process of converting a luminance level for each pixel so that more output luminance levels are assigned to a luminance band having a luminance distribution larger than a flat reference luminance distribution to improve visibility of a video, and
wherein the video composing unit is configured to change a gain of the luminance level converting process in accordance with an average pixel value level of the video inputted from the video input unit.

17. The projector according to claim 16,
wherein the gain of the luminance level converting process increases as the average pixel value level of the video inputted from the video input unit rises from 0%, and the gain can be changed so as to be saturated at a predetermined gain when the average pixel value level of the video inputted from the video input unit exceeds a predetermined value.

18. The projector according to claim 17, further comprising:
an operation input unit configured to receive an operation input from a user,
wherein the predetermined gain at which the gain of the luminance level converting process is saturated can be changed based on an operation input of the user via the operation input unit.

19. The projector according to claim 16, further comprising:
an operation input unit configured to receive an operation input from a user,
wherein a setting menu screen by which the user can change setting by an operation input via the operation input unit can be displayed on the display video to be projected from the video projecting unit, and
wherein on the setting menu screen,
the gain of the luminance level converting process can be selected from a plurality of stages, and
the gain of the luminance level converting process can be selected so as to be set to any of a first state in which the gain is not changed in accordance with the average pixel value level of the video inputted from the video input unit and a second state in which the gain of the luminance level converting process can be changed in accordance with the average pixel value level of the video inputted from the video input unit.

20. The projector according to claim 19,
wherein, in a case where a stage for minimizing the gain of the luminance level converting process is selected from the plurality of stages for the gain of the luminance level converting process by means of the setting menu screen and selection is changed from the first state to the second state, a value after the gain of the luminance level converting process is changed increases larger than a value before the change even though the average pixel value level of the video inputted from the video input unit is any value.

21. A projector comprising:
a video input unit;
a first Retinex processing unit configured to perform a first Retinex process on a video inputted from the video input unit;
a second Retinex processing unit configured to perform a second Retinex process, which is different from the first Retinex process, on the video inputted from the video input unit;
a video composing unit configured to compose a video processed by the first Retinex processing unit and a video processed by the second Retinex processing unit in accordance with a feature of the video inputted from the video input unit;
a video generating unit configured to generate a video by correcting a vector on a color space in a same direction as a vector on a color space included by the video inputted from the video input unit by using a color correction ratio calculated based on an absolute value of a color space vector in a signal of the video composed by the video composing unit; and
a video projecting unit configured to project a display video based on the video outputted from the video generating unit,
wherein in a process of composing the video processed by the first Retinex processing unit and the video processed by the second Retinex processing unit, the video composing unit is configured to perform a luminance level converting process of converting a luminance level for each pixel so that more output luminance levels are assigned to a luminance band having a luminance distribution larger than a flat reference luminance distribution to improve visibility of a video,
wherein the video composing unit is configured to change the gain of the luminance level converting process in accordance with an average pixel value level of the video inputted from the video input unit,
wherein the video generating unit is configured to multiply the color correction ratio by a gain for the color correction ratio which is different from the gain of the luminance level converting process, and
wherein the video generating unit is configured to change the gain for the color correction ratio in accordance with the average pixel value level of the video inputted from the video input unit.

22. The projector according to claim 21,
wherein the gain of the luminance level converting process increases as the average pixel value level of the video inputted from the video input unit rises from 0%, and the gain can be changed so as to be saturated at a predetermined gain when the average pixel value level of the video inputted from the video input unit exceeds a predetermined value.

23. The projector according to claim 22, further comprising:
an operation input unit configured to receive an operation input from a user,
wherein the predetermined gain at which the gain of the luminance level converting process is saturated can be changed based on an operation input of the user via the operation input unit.

24. The projector according to claim 21,
wherein the gain for the color correction ratio increases as the average pixel value level of the video inputted from the video input unit rises from 0%, and the gain can be changed so as to be saturated at a predetermined gain when the average pixel value level of the video inputted from the video input unit exceeds a predetermined value.

25. The projector according to claim 21, further comprising:
an operation input unit configured to receive an operation input from a user,
wherein a setting menu screen by which the user can change setting by an operation input via the operation input unit can be displayed on the display video to be projected from the video projecting unit, and
wherein on the setting menu screen,
the gain of the luminance level converting process can be selected from a plurality of stages, and
the gain of the luminance level converting process can be selected so as to be set to any of a first state in which the gain is not changed in accordance with the average pixel value level of the video inputted from the video input unit and a second state in which the gain of the luminance level converting process can be changed in accordance with the average pixel value level of the video inputted from the video input unit.

26. The projector according to claim 25,
wherein the gain for the color correction ratio increases as the average pixel value level of the video inputted from the video input unit rises from 0%, and the gain can be changed so as to be saturated at a predetermined gain when the average pixel value level of the video inputted from the video input unit exceeds a predetermined value.

27. The projector according to claim 26,
wherein, in a case where a stage other than a stage for maximizing the gain of the luminance level converting process is selected from the plurality of stages for the gain of the luminance level converting process by means of the setting menu screen, the average pixel value level of the video inputted from the video input unit exceeds the predetermined value, and selection is changed from the first state to the second state, then a value after the gain for the color correction ratio is changed increases larger than a value before the change.

28. The projector according to claim 26,
wherein, in a case where the stage for maximizing the gain of the luminance level converting process is selected from the plurality of stages for the gain of the luminance level converting process by means of the setting menu screen, the average pixel value level of the video inputted from the video input unit is smaller than the predetermined value, and selection is changed from the first state to the second state, then a value after the gain for the color correction ratio is changed decreases smaller than a value before the change.

29. The projector according to claim 21,
wherein the gain of the luminance level converting process increases as the average pixel value level of the video inputted from the video input unit rises from 0%, and the gain can be changed so as to be saturated at a first gain when the average pixel value level of the video inputted from the video input unit exceeds a first value,
wherein the gain for the color correction ratio increases as the average pixel value level of the video inputted from the video input unit rises from 0%, and the gain can be changed so as to be saturated at the gain for the color correction ratio when the average pixel value level of the video inputted from the video input unit exceeds a second value, and
wherein the second value of the average pixel value level is a value higher than the first value.

30. The projector according to claim 29, further comprising:
an operation input unit configured to receive an operation input from a user,
wherein the first gain at which the gain of the luminance level converting process is saturated can be changed based on an operation input of the user via the operation input unit, and
wherein the second gain at which the gain for the color correction ratio is saturated does not change even in a case where the first gain, at which the gain of the luminance level converting process is saturated is changed based on an operation input of the user via the operation input unit.

* * * * *